US012133058B2

(12) United States Patent
Heldner et al.

(10) Patent No.: US 12,133,058 B2
(45) Date of Patent: Oct. 29, 2024

(54) HEARING SYSTEM AND METHOD OF ITS OPERATION FOR PROVIDING AUDIO DATA WITH DIRECTIVITY

(71) Applicant: SONOVA AG, Staefa (CH)

(72) Inventors: Benjamin Heldner, Murten (CH); Xavier Gigandet, Cousset (CH)

(73) Assignee: Sonova AG, Staefa (CH)

(*) Notice: Subject to any disclaimer, the term of this patent is extended or adjusted under 35 U.S.C. 154(b) by 153 days.

(21) Appl. No.: 17/789,844

(22) PCT Filed: Jan. 17, 2020

(86) PCT No.: PCT/EP2020/051155
§ 371 (c)(1),
(2) Date: Jun. 29, 2022

(87) PCT Pub. No.: WO2021/144031
PCT Pub. Date: Jul. 22, 2021

(65) Prior Publication Data
US 2023/0031093 A1 Feb. 2, 2023

(51) Int. Cl.
*H04R 5/033* (2006.01)

(52) U.S. Cl.
CPC .................................... *H04R 5/033* (2013.01)

(58) Field of Classification Search
CPC .......... H04R 25/00; H04R 5/02; H04R 5/033; H04R 25/55; H04R 25/554; H04S 1/005
USPC ........................ 381/23.1, 309, 311, 312, 315
See application file for complete search history.

(56) References Cited

U.S. PATENT DOCUMENTS

| | | | | |
|---|---|---|---|---|
| 8,989,413 B2 * | 3/2015 | Ridler | H04R 25/405 | 381/313 |
| 2010/0278365 A1 * | 11/2010 | Biundo Lotito | H04R 25/405 | 381/315 |
| 2013/0064404 A1 * | 3/2013 | Ridler | H04R 25/405 | 607/57 |
| 2014/0176297 A1 * | 6/2014 | Mulder | G09B 21/009 | 340/4.14 |
| 2015/0319530 A1 * | 11/2015 | Virolainen | G06T 7/248 | 381/303 |
| 2019/0028817 A1 * | 1/2019 | Gabai | H04R 25/407 | |
| 2021/0160613 A1 * | 5/2021 | Gigandet | G10L 21/0216 | |

FOREIGN PATENT DOCUMENTS

| | | |
|---|---|---|
| EP | 2809087 A1 | 12/2014 |
| EP | 2838210 A1 | 2/2015 |
| EP | 2840807 | 2/2015 |

(Continued)

OTHER PUBLICATIONS

"International Search Report and Written Opinion mailed Sep. 25, 2020 in corresponding International Application No. PCT/EP2020/051155 with the International Filing Date of Jan. 17, 2020".

*Primary Examiner* — William A Jerez Lora
(74) *Attorney, Agent, or Firm* — ALG Intellectual Property, LLC

(57) ABSTRACT

The disclosure relates to a method of operating a hearing system comprising an ear unit wearable at an ear of a user, an output transducer included in the ear unit, and a detector arrangement comprising a plurality of spatially separated sound detectors and configured to provide audio data representative of the detected sound.

20 Claims, 9 Drawing Sheets

(56) References Cited

FOREIGN PATENT DOCUMENTS

| | | | |
|---|---|---|---|
| EP | 2908549 | | 8/2015 |
| EP | 3057337 | A1 | 8/2016 |
| WO | 2008098590 | | 8/2008 |
| WO | 2011083181 | A2 | 7/2011 |

* cited by examiner

HEARING SYSTEM AND METHOD OF ITS OPERATION FOR PROVIDING AUDIO DATA WITH DIRECTIVITY

TECHNICAL FIELD

This disclosure relates to a method of operating a hearing system comprising an ear unit configured to be worn at an ear of a user, and a detector arrangement comprising a plurality of spatially separated sound detectors and configured to provide audio data representative of the detected sound, according to the preamble of claim 1. The disclosure further relates to a computer-readable medium storing instructions for performing the method, according to the preamble of claim 13. The disclosure further relates to a hearing system comprising the ear unit and the detector arrangement, according to the preamble of claim 14.

BACKGROUND

Such a hearing system typically comprises a plurality of spaced apart sound detectors configured to detect sound at different spatial positions allowing to resolve different directions from which sound is detected by the sound detectors. Audio data representative of the detected sound can thus be provided with a directivity corresponding to a particular direction of the detected sound such that sound detected from this direction is predominantly represented in the audio data.

Hearing systems of that kind can comprise a remote device including the detector arrangement at a position remote from the ear unit. After detection of the sound, the audio data is transmitted from the remote device to the ear unit. The directivity of the audio data can be provided by the ear unit after the transmission, or by the remote device before the transmission, or to one part by the remote device and to another part by the hearing device. Usually, the audio data is transmitted wirelessly. For instance, a FM (frequency modulation) radio link or a digital modulation technique can be employed for the audio data transmission. The remote device can be provided as a stationary unit comprising a support for a fixed positioning. For instance, the remote device can be a table microphone configured to be placed on a plane. The remote device can also be provided as a portable unit intended to be worn by an individual such as, for instance, a significant other of a hearing impaired user wearing the hearing device.

The ear unit typically comprises an output transducer configured to stimulate the user's hearing based on the transmitted audio data. The output transducer can be implemented in a receiver unit. For instance, the output transducer can be a loudspeaker of a hearing aid or an earphone reproducing sound encoded in the audio data at the user's ear, or an electrode array of a cochlear implant producing electric signals stimulating the auditory nerve based on the audio data. The hearing device may further comprise a microphone or a plurality of microphones allowing to supplement the sound detected by the remote device with sound detected by the hearing device and/or to switch between the remote device and hearing device for sound detection.

Some applications of such a hearing system comprise educational settings. For instance, children suffering from auditory processing disorders (APD) can benefit from hearing a teacher's voice captured by the remote microphone at an enhanced level with respect to background noise prevailing in the classroom. Similarly, children suffering from hearing loss can benefit from hearing a teacher's voice captured by the remote microphone at an enhanced signal-to-noise ratio (SNR) as compared to the teacher's voice detected by a hearing aid worn at the ear level. Some other applications include situations involving multiple sound sources in an environment of the user such as, for instance, multiple conversation partners and/or meeting attendees and/or other communication participants. Capturing the voice of a selected participant or a selected group of the participants by the remote microphone from a particular direction, for instance selecting a currently speaking person addressing the whole audience or a momentary conversation partner during a bilateral dialogue, can equally improve the speech intelligibility due to an improved SNR and/or an enhanced sound level of an audio content of particular interest.

In many applications, however, a direction of the detected sound, which the user desires to be predominantly reproduced, changes over time. For instance, a conversation partner may change, or another talking person of interest may change or change its location. Such a situation arises frequently when multiple persons are gathered around a table. In those situations, it would be desirable that the audio data transmitted from the remote device, for instance from a table microphone placed at a table center, can be provided with a changing directivity corresponding to momentary preference of the user wearing the hearing device. In some situations, for instance when a single person is speaking in front of a quiet background, the preferred directivity may coincide with the direction from which the detected sound has the highest level and may thus be automatically determined. Yet in many other situations, for instance when the user rather arbitrarily changes a conversation partner or his listening intention to another sound source of interest in the environment, an automatic detection of the preferred audio directivity by the hearing system appears infeasible. Especially in this kind of situations, it would be beneficial to allow the user to manually select the desired directivity in a convenient way, in particular to allow the user to select a specific target in his environment for which the directivity shall be provided.

International patent application publication WO 2008/098590 discloses a hearing system of the aforementioned kind comprising a hearing device worn at an ear of a user, and a remote device comprising a plurality of spaced apart sound detectors. Each sound detector includes a dedicated signal channel providing audio data of the detected sound, wherein the audio data provided at each channel is wirelessly transmitted from the remote device to the hearing device. The hearing device comprises a processor configured to provide the audio data received from the multiple channels with a directivity by performing an acoustic beamforming. The hearing system further comprises a remote control wirelessly connected to the hearing device for transmitting control commands. The connection is established via the same wireless link used for wirelessly transmitting the audio data from the remote device to the hearing device. The remote control includes control elements operable by the user and allowing the user to select a width and direction of the formed acoustic beam.

Manually adjusting the directivity of the audio data by such control elements, however, can be cumbersome. On the one hand, when the directivity is adjustable in relatively fine increments via the control elements, the adjustment can be rather tedious, for instance when the directivity shall be changed by a comparatively large amount. On the other hand, when the directivity is adjustable in relatively large increments via the control elements, the adjustment can be rather imprecise and a desired directivity may not be available to the user. In all cases, the carried out adjustment can be untraceable or unclear to the user since no indication of the actually changed directivity—except the changed audio data reproduced by the output transducer at the user's ear, which can be ambiguous,—is available to the user. In addition, the requirement of an additional remote control can be bothersome, particularly in view of other electronic devices needed by the user, such as a smartphone or another handheld device, which the user carries around with himself on a daily basis. Moreover, the remote control transmitting the control command using the same communication link over which the audio data is transmitted can be unfavorable, in particular due to a needlessly long signal path for transmitting the control command and an undesired dependency of the control command transmission on an established audio data transmission line.

In other hearing systems of that kind, the detector arrangement is included in the ear unit, or in two ear units configured to be worn at both ears of the user. The directivity of the audio data may then be provided by a binaural acoustic beamforming producing an acoustic beam directed in a particular direction. An inertial sensor, for instance an accelerometer, may be implemented in the ear unit to determine a spatial orientation of the user's head and to provide the directivity of the audio data depending on the head orientation which is changing during rotational movements of the user's head. Such a hearing system is disclosed in European patent application publication EP 2 908 549 A1. Often, however, the user does not desire to adjust the directivity of the audio data after each head movement. For instance, the user may desire to keep the directivity fixed toward a conversation partner located at a steady position, even though the user is shaking his head or briefly looking in other directions from time to time. Adjusting the directivity depending on the user's head orientation can thus be rather inconvenient or even disturbing for the user.

SUMMARY

It is an object of the present disclosure to avoid at least one of the above mentioned disadvantages and to provide a hearing system and method of its operation with an improved adjustability of the directivity provided in the audio data, in particular an easier and/or more precise and/or user-friendlier adjustability of the directivity. It is a further object to augment the visual verifiability of the directivity selected by the adjustment. It is another object to enable a user of the hearing system to reduce an amount of electronic devices needed in his life. It is another object to provide a more direct and/or simpler and/or straightforward signal path required for the directivity adjustment. It is yet another object to allow the user a control of various operations of the hearing system by rather simple manual gestures. It is a further object to enable the user to manually select a sound source in his environment for which a directivity of the detected sound shall be provided in the audio data.

At least one of these objects can be achieved by a method of operating a hearing device comprising the features of patent claim 1 and/or a computer-readable medium comprising the features of patent claim 13 and/or a hearing system comprising the features of patent claim 14. Advantageous embodiments are defined by the dependent claims and the following description.

Accordingly, the present disclosure proposes a method of operating a hearing system, the hearing system comprising an ear unit configured to be worn at an ear of a user, an output transducer included in the ear unit and configured to stimulate the user's hearing, and a detector arrangement comprising a plurality of spatially separated sound detectors and configured to provide audio data representative of the detected sound. The method comprises providing, in a control data provision step, control data based on orientation data generated by a handheld device configured to be held at a hand of the user during changing a spatial orientation of the handheld device, the orientation data indicative of the spatial orientation of the handheld device. The method further comprises providing, in a directivity provision step, the audio data with a directivity depending on the control data.

Thus, by controlling the directivity of the audio data depending on the orientation data generated by the handheld device, the directivity can be adjusted by the user in a convenient way by an appropriate manipulation of the spatial orientation of the handheld device. In particular, the adjustments by manual rotations of the handheld device can offer the advantage of a more reliable and/or easier controllability as compared to other actions carried out by the user as, for instance, adjustments depending on a movement of the user's head. Changing the spatial orientation of the handheld device can also yield a verifiable visualization of a corresponding change of the directivity of the audio data, which may be observed by the user by identifying a direction in which the remote device extends in the surrounding space. By obtaining the control data from a handheld device which is used by the user for different purposes, such as a smartphone, the user may perform an adjustment of the directivity without any extra device.

Independently, the present disclosure proposes a non-transitory computer-readable medium storing instructions that, when executed by a processing unit, cause the processing unit to perform the method.

Independently, the present disclosure proposes a hearing system comprising an ear unit configured to be worn at an ear of a user, an output transducer included in the ear unit and configured to stimulate the user's hearing, and a detector arrangement comprising a plurality of spatially separated sound detectors and configured to provide audio data representative of the detected sound. The hearing system further comprises communication port configured to receive control data from a handheld device configured to be held at a hand of the user during changing a spatial orientation of the handheld device, the control data based on orientation data generated by the handheld device, the orientation data indicative of the spatial orientation of the handheld device. The hearing system further comprises a processing unit configured to provide the audio data with a directivity depending on the control data.

Subsequently, additional features of some implementations of the hearing system and the method of its operation are described. Each of those features can be provided solely or in combination with at least another feature. The features may be correspondingly applied in some implementations of the hearing system and/or the method of operating the hearing system and/or the computer-readable medium. In particular, the processing unit of the hearing systems can be configured to perform operations of the method described below.

In some implementations, the method comprises determining, in a direction determining step, a selected direction by comparing the orientation data with reference data, wherein, in the directivity provision step, the directivity of the audio data is provided corresponding to the selected direction. The selected direction may be a direction selected by the user by changing the spatial orientation of the handheld device. The reference data may be indicative of orientation data generated by the handheld device at a first time. The orientation data compared with the reference data may then be generated by the handheld device at a second time. In particular, the changing spatial orientation of the handheld device may thus be determined independently from the spatial orientation of the detector arrangement.

It may also be that the reference data is indicative of a relation between the orientation data and a spatial orientation of the detector arrangement. For instance, the reference data may be indicative of a difference between the spatial orientation of the handheld device and the spatial orientation of the detector arrangement. In particular, the changing spatial orientation of the handheld device may thus be determined relative to the spatial orientation of the detector arrangement. The reference data relating the orientation data to the spatial orientation of the detector arrangement may be employed to determine the selected direction in a reference frame of the detector arrangement. In this way, an accuracy of a desired adjustment of the directivity may be enhanced.

In some implementations, the method comprises determining, in an initialization step, the reference data based on the orientation data generated at an initial time. The orientation data generated at a time subsequent to the initial time may be compared, in the direction determining step, with the reference data to determine the selected direction. The orientation data generated at a plurality of subsequent times may thus be compared to the reference data to determine the selected direction at each subsequent time. The initialization step may comprise initiating the initialization step by a user interface. For instance, a user interface on the handheld device and/or on the ear unit and/or on a remote device connected to the handheld device and/or to the ear unit may be employed.

In some implementations, the initialization step may be employed to provide the reference data relating the orientation data to the spatial orientation of the detector arrangement. In particular, the orientation data may be associated with a default spatial orientation of the detector arrangement via the reference data. The default spatial orientation may correspond to a spatial orientation of the detector arrangement during a stationary placement of the detector arrangement and/or a placement of the detector arrangement at the initial time. The detector arrangement may be positioned at the default spatial orientation during the initialization step.

The detector arrangement may be provided with a visible orientation characteristic allowing the user to align the spatial orientation of the handheld device with the orientation characteristic. The orientation characteristic may indicate the default spatial orientation of the detector arrangement relative to the spatial orientation of the handheld device. It also may be that a plurality of orientation characteristics indicating a plurality of default spatial orientations of the detector arrangement relative to the handheld device is provided. A particular orientation characteristic of the plurality may be selectable via a user interface before initiating the initialization step.

The orientation characteristic may be implemented as any feature allowing to identify the spatial orientation of the detector arrangement in a surrounding environment. For instance, the orientation characteristic may be provided by a housing enclosing the detector arrangement, the housing having an asymmetric shape allowing to identify the spatial orientation of the detector arrangement in the surrounding environment. The orientation characteristic may also be provided by a visual marking, such as a label and/or a light emitter, allowing to identify the spatial orientation of the detector arrangement in the surrounding environment. The visual marking may be provided on a housing enclosing the detector arrangement. For instance, the detector arrangement may be included in a housing of the ear unit and/or a housing of a remote device connected to the ear unit.

In some implementations, the reference data is provided by orientation data indicative of the spatial orientation of the detector arrangement. Thus, a relation between the orientation data and a spatial orientation of the detector arrangement may be derived from the reference data. The ear unit and/or the remote device may be configured to generate the orientation data indicative of the spatial orientation of the detector arrangement. The reference data may then be generated by a sensor provided at a fixed position relative to at least one sound detector of the detector arrangement. The sensor may comprise an inertial sensor and/or a compass, in particular an electronic compass. The sensor may be provided at a fixed position relative to the detector arrangement. The sensor may be included in the ear unit and/or in a remote device connected to the ear unit.

In some implementations, the direction determining step is performed at the control data provision step, wherein the control data is provided such that the control data is indicative of the selected direction. The selected direction may thus be determined by the handheld device, in particular by a processor included in the handheld device. In some implementations, the direction determining step is performed after the control data provision step, wherein the control data is provided such that it includes the orientation data compared with the reference data. The selected direction may then be determined by the ear unit and/or a remote device connected to the ear unit, in particular by a processor included in the ear unit and/or the remote device. The processing unit may comprise the processor included in the ear unit and/or in the remote device. The processing unit may further comprise the processor included in the handheld device. In some implementations, the method comprises generating the orientation data by the handheld device and providing the control data based on the orientation data.

The control data provision step may comprise receiving the control data by the ear unit and/or by a remote device connected to the ear unit from the handheld device. The control data may be received via a wireless connection. The control data may be transmitted from the handheld device to the ear unit and/or a remote device connected to the ear unit via the wireless connection. The wireless connection may be based on a Bluetooth protocol.

In some implementations, the method comprises determining, based on the orientation data, a spatial orientation of the handheld device relative to a predefined plane, wherein the directivity provision step is performed depending on the spatial orientation of the handheld device relative to the predefined plane. The predefined plane may be a plane in which the handheld device is rotatable, wherein the control data based on the orientation data generated during and/or after the rotation in the predefined plane can control a change of the directivity of the audio data in the directivity provision step. In particular, the directivity provision step may be activated and/or deactivated depending on the spatial orientation of the handheld device relative to the predefined plane. When the directivity provision step is deactivated, the providing the control data may be disabled and/or the control data may be disregarded during a processing of the audio data. When the directivity provision step is deactivated, a different operation may be performed. The different operation may comprise a processing of the audio data differing from the directivity provision step. The different operation may comprise providing the audio data without a directivity and/or with a fixed directivity and/or with an automatically adjusted directivity independent from a manual user interaction. In this way, the user may be enabled to control different functionalities of the hearing system by changing the spatial orientation of the handheld device relative to the predefined plane.

In some implementations, the predefined plane corresponds to a plane in which the directivity of the audio data is provided in the directivity provision step. In particular, the predefined plane may correspond to a plane in which a direction of an acoustic beam is formed. Thus, the user may intuitively adjust the directivity of the audio data by changing the spatial orientation of the handheld device in parallel to the plane in which the directivity is provided. Moreover, the user may control the different operation by changing the spatial orientation of the handheld device relative to the plane in which the directivity is provided. The predefined plane may be parallel to a ground plane and/or normal to the direction of the gravitational force.

The changing the spatial orientation of the handheld device relative to the predefined plane may correspond to predefined manual gestures operable by the user. Such a manual gesture may be performed by the user in a convenient and easily memorizable way. For instance, the manual gesture may comprise flipping the handheld device by 180 degrees and/or tilting the handheld device by 90 degrees relative to the predefined plane.

In some implementations, in the directivity provision step, the directivity of the audio data is continuously changed at a continuous change of the orientation data. Thus, the user may be enabled to select a target in his environment for which the directivity shall be provided at a high precision.

In some implementations, in the directivity provision step, the directionality of the audio data is unaltered when a change of the orientation data is determined to be below a threshold. The directivity of the audio data can thus be gradually changed at a continuous change of the orientation data. The gradual change can be defined by the threshold. Thus, the directivity adjustment by the manual user interaction may be more stable and less prone to undesired fluctuations which may be caused, for instance, by a shaky hand of the user. In particular, the directivity of the audio data may be kept constant when the change of the orientation data is determined to be below the threshold. The directivity of the audio data may be adjusted when the change of the orientation data is determined to be above the threshold. The adjustment depending on the threshold may be controlled by the control data provided in the control data provision step and/or determined in the directivity provision step based on the control data. The threshold may correspond to a threshold angle. The threshold angle may be defined as an angle by which the spatial orientation of the handheld device must be changed at least by the user in order to adjust the directivity of the audio data in the directivity provision step. For instance, the threshold angle may be at least 10 degrees, in particular at least 20 degrees.

In some implementations, at least one sound detector of the detector arrangement is included in the ear unit. The ear unit may be a first ear unit configured to be worn at a first ear, the hearing system further comprising a second ear unit configured to be worn at a second ear. The sound may be detected at the ear level by the sound detector of the detector arrangement included in the first ear unit and/or in the second ear unit. In some implementations, the sound represented by the audio data is only detected at the ear level. In such a case, the control data based on the orientation data generated by the handheld device can allow the user to advantageously adjust the directivity independently from orientation changes of the detector arrangement caused by any head movements. The detector arrangement may then comprise at least two sound detectors included in the ear units. In some implementations, the first ear unit comprises a first sound detector and the second ear unit comprises a second sound detector, wherein the detector arrangement comprises the first sound detector and the second sound detector. The audio data may then be provided with the directivity by a binaural acoustic beamforming. The ear unit, in particular the first ear unit and/or second ear unit, may also comprise a plurality of the sound detectors of the detector arrangement.

In some implementations, at least one sound detector of the detector arrangement is included in a remote device, the remote device configured to transmit the audio data representative of the detected sound to the ear unit from a position remote from the ear unit. The sound may be detected remote from the ear level by the sound detector of the detector arrangement included in the remote device. In some implementations, the sound represented by the audio data is only detected remote from the ear level. The detector arrangement may then comprise at least two sound detectors included in the remote device. The detector arrangement may comprise at least one additional sound detector provided in the ear unit, in particular in the first ear unit and/or in the second ear unit. The detector arrangement may also be fully included in the remote device. The remote device may comprise at least one visible orientation characteristic allowing the user to align the spatial orientation of the handheld device with the orientation characteristic.

In some implementations, the sound represented by the audio data is only detected at the ear level or only detected remote from the ear level. The hearing system may comprise a user interface allowing a switching between the sound detection at the ear level and the sound detection remote from the ear level. The detector arrangement may comprise at least two sound detectors included in ear units, and at least two sound detectors included in the remote device.

In some implementations, the remote device comprises a support configured to be stationary placed on a plane, in particular a ground plane. For instance, the remote device may be a table microphone. The predefined plane relative to which a spatial orientation of the handheld device is determined may be defined as a plane extending parallel to the plane on which the support can be stationary placed.

The communication port may be provided in the remote device and/or in the ear unit. The communication port may be configured to receive the control data via a wireless connection with the handheld device. The output transducer may be configured to stimulate the user's hearing based on the audio data provided with the directivity, in particular based on an audio signal including the audio data. The handheld device may comprise an inertial sensor configured to generate the orientation data. For instance, the inertial sensor may be an accelerometer configured to detect an acceleration and/or movement of the handheld device based on which the orientation data can be generated. The inertial sensor may also be configured to detect a direction of the gravitational force. The processing unit may be configured to receive the control data at different times and to provide the audio data with the directivity at the different times. The different times may be separated by a predetermined time interval. The directivity may correspond to a selected direction controlled by the control data such that the sound detected from the selected direction is predominantly represented in the audio data. The audio data may be provided with the directivity by performing an acoustic beamforming. The handheld device may be provided as a smartphone and/or a tablet and/or another multi-purpose device that can be operated during placement in a hand of the user and which is configured to provide the orientation data.

In some implementations, the hearing system further comprises a non-transitory computer-readable medium storing instructions that, when executed by a processor included in the handheld device, cause the processor to provide the control data. For instance, the user may download an application containing the instructions from a cloud to the handheld device. In some implementations, the hearing system comprises the handheld device, wherein the handheld device includes a processor configured to provide the control data.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION OF THE DRAWINGS

Figure 1:
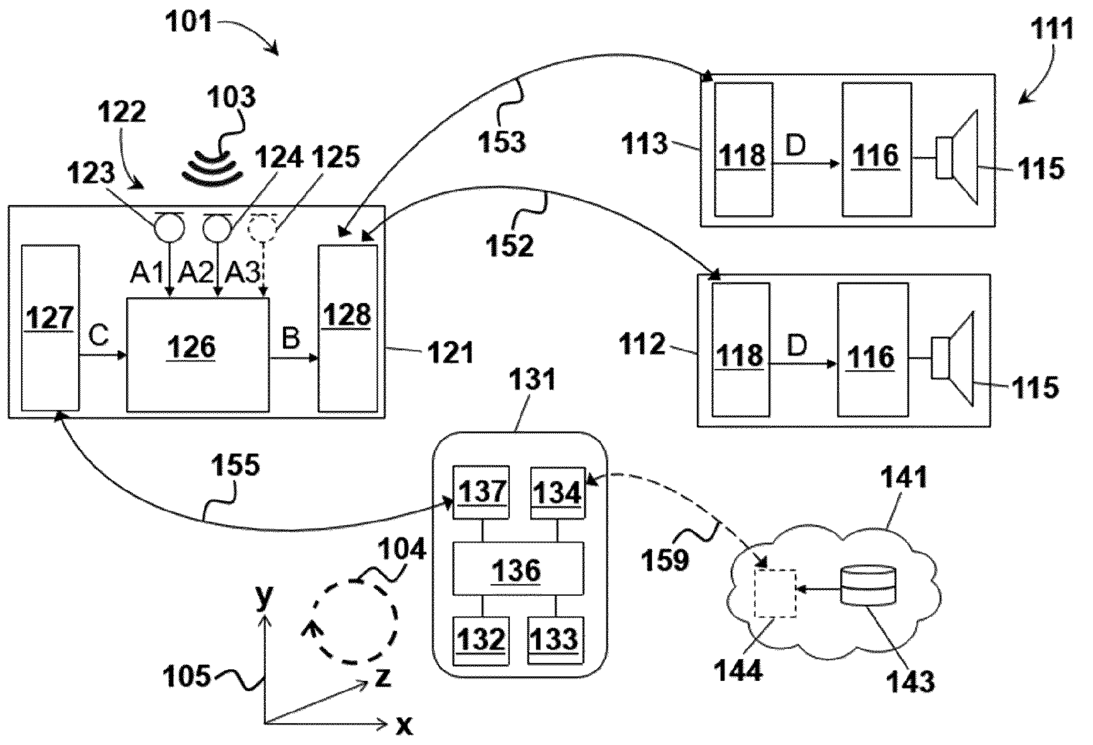
FIGS. 1-4 schematically illustrate exemplary hearing systems including a hearing device and a remote device.

FIG. 1 illustrates a hearing system 101 comprising a hearing device 111 configured to be worn at an ear of a user. Hearing device 111 may be implemented by any type of hearing device configured to enable or enhance hearing by a user wearing hearing device 111. For example, hearing device 111 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis.

Different types of hearing device 111 can also be distinguished by the position at which they are worn at the ear. Some hearing devices, such as behind-the-ear (BTE) hearing aids and receiver-in-the-canal (RIC) hearing aids, typically comprise an earpiece configured to be at least partially inserted into an ear canal of the ear, and an additional housing configured to be worn at a wearing position outside the ear canal, in particular behind the ear of the user. Some other hearing devices, as for instance earbuds, earphones, in-the-ear (ITE) hearing aids, invisible-in-the-canal (IIC) hearing aids, and completely-in-the-canal (CIC) hearing aids, commonly comprise such an earpiece to be worn at least partially inside the ear canal without an additional housing for wearing at the different ear position. Some other hearing devices, such as over-ear headphones or headsets, can be configured to be worn at the ear entirely outside the ear canal.

In the example as shown, hearing device 111 is a binaural device comprising a left ear unit 112 to be worn at a left ear of the user, and a right ear unit 113 to be worn at a right ear of the user. Each ear unit 112, 113 includes a processor 116 communicatively coupled to an output transducer 115. Output transducer 115 may be implemented by any suitable audio output device, for instance a loudspeaker or a receiver of a hearing device or an output electrode of a cochlear implant system. Processor 116 is configured to provide an audio output signal to output transducer 115. The audio output signal may be amplified by a power amplifier included in the respective ear unit 112, 113, which is not shown in FIG. 1, before the signal is reproduced by output transducer 115. Processor 116 may be a digital signal processor (DSP) configured to perform signal processing of audio data to provide the audio output signal and/or to pass on pre-processed audio data as the audio output signal. In some other implementations, processor 116 is only provided in one of ear units 112, 113, wherein output transducer 115 of each ear unit 112, 113 is communicatively coupled to processor 116. In still other implementations, the audio output signal based on pre-processed audio data is provided to output transducer 115 without a processor included in any of ear units 112, 113.

Ear units 112, 113 further include a communication port 118 configured to receive audio data via a respective wireless communication link 152, 153. Audio data communication port 118 is communicatively coupled to processor 116 via a signal channel in order to supply processor 116 with a signal D containing the received audio data. Alternatively, a plurality of signal channels may be provided for supplying distinguished audio data separately to processor 116, for instance audio data associated with sound detected by different sound detectors. Wireless link 152, 153 may be a radio frequency link, for example an analog frequency modulation (FM) link or a digital link. The FM link and/or digital link may be implemented as disclosed in patent application publication No. WO 2008/098590 in further detail, which disclosure is herewith incorporated by reference. Wireless link 152, 153 may also be established via a Bluetooth protocol.

In some implementations, ear units 112, 113 further include a microphone or a plurality of spatially separated sound detectors configured to detect sound at the ear level and to provide audio data representative of the detected sound to processor 116. Hearing device 111 may include additional or alternative components as may serve a particular implementation.

Hearing system 101 further comprises a remote device 121 configured to be operated remote from the user, in particular independently from any movement of the user. More particularly, remote device 121 can be a stationary device configured to be operated at a stationary position in an environment of moving sound sources such as, for instance, speaking individuals. Remote device 121 comprises a detector arrangement 122 including at least two spatially separated sound detectors 123, 124, 125. For instance, each sound detector 123-125 may be implemented as a microphone. Detector arrangement 122 may then be implemented as a microphone array. Sound detectors 123-125 are configured to detect sound 103 at different spatial positions allowing to distinguish between sound components detected from different directions at the spatial positions. Each of sound detectors 123-125 comprises a dedicated signal channel delivering a respective audio signal A1, A2, A3 containing audio data representative of sound 103 detected at the respective spatial position. The audio data in signals A1-A3 thus contains information about the direction from which sound represented by the audio data has been detected by sound detectors 123-125. The audio data in signals A1-A3 is unmixed. Signals A1-A3 are thus considered as "raw" audio signals.

Remote device 121 further comprises a processor 126. Processor 126 comprises a DSP. Processor 126 is communicatively coupled to sound detectors 123-125 via the separate signal channels such that the audio data in each of signals A1-A3 can be separately supplied to processor 126. Processor 126 is configured to process the audio data received via audio signals A1-A3 in order to provide the audio data with a directivity. The directivity may correspond to any direction from which sound has been detected by sound detectors 123-125. As a result, the sound detected from this direction may be predominantly represented in the audio data after the signal processing performed by processor 126. In particular, processor 126 can be configured to perform an acoustic beamforming to provide the audio data representative of an acoustic beam formed in this direction. To this end, processor 126 can be configured to perform an appropriate mixing of the audio data in raw audio signals A1-A3 to produce the processed audio data. Processor 126 comprises an output signal channel on which an output signal B containing the audio data provided with the directivity can be delivered. A processing unit of hearing system 101 comprises processor 126 of remote device 121. The processing unit may further comprise processor 116 of ear units 112, 113.

Remote device 121 further comprises a communication port 128 configured to send audio data to hearing device 111 via the respective communication link 152, 153. Audio data communication port 128 is communicatively coupled to processor 126 via the output channel delivering output signal B. The audio data processed by processor 126 can thus be supplied from processor 126 to communication port 128. Communication port 128 is configured to send the processed audio data to communication port 118 of ear units 112, 113 via the respective communication link 152, 153. After receipt, the audio data received by communication port 118 is supplied to processor 116 as a signal D via an input signal channel.

Remote device 121 further comprises a communication port 127 configured to receive control data from a handheld device 131 via a communication link 155. Communication link 155 is a wireless link. Control data communication link 155 is established separate from audio data communication link 152, 153. Control data can thus be transmitted via communication link 155 independently from audio data transmitted via communication link 152, 153. Control data communication port 127 is communicatively coupled to processor 126 via a control signal channel delivering a control signal C containing the control data to processor 126. Processor 126 is configured to provide the audio data received via audio signals A1-A3 with a directivity depending on the control data.

In some implementations, communication port 127 is configured to establish communication link 155 with handheld device 131 via a Bluetooth protocol. In those implementations, communication link 155 is referred to as a Bluetooth link. Bluetooth link 155 allows to implement the transmission of control data to remote device 121 in a reliable and convenient way, in particular by exploiting an appropriate communication port of handheld device 131 in conformity with the Bluetooth standard which may implemented by default in handheld device 131.

Handheld device 131 is configured to be held at a hand of the user during changing a spatial orientation of the handheld device. In some implementations, hearing system 101 further comprises handheld device 131 providing the control data. For instance, handheld device 131 may be a separate unit specifically dedicated to solely control an operation of hearing system 101, such as a remote control, or may be configured to also provide further functionalities unrelated to an operation of hearing system 101, such as a smartphone or a tablet. In some other implementations, hearing system 101 further comprises a computer-readable medium 143 storing instructions that, when executed by a processor included in the handheld device, cause the processor to provide the control data. In particular, the computer-readable medium 143 can be implemented as a database in a cloud 141. A program 144 enabling the processor of a handheld device to provide the control data may thus be downloaded from database 143. In this way, a user may apply a handheld device currently employed by the user for different purposes, in particular a smartphone or a tablet, to also operate hearing system 101.

Handheld device 131 comprises an orientation sensor 132 configured to generate orientation data indicative of a spatial orientation. Orientation sensor 132 can include an inertial sensor, in particular a motion sensor, for instance an accelerometer, and/or a rotation sensor, for instance a gyroscope and/or an accelerometer. Orientation sensor 132 can also comprise an optical detector such as a camera. For instance, the optical detector can be employed as a motion sensor and/or a rotation sensor by generating optical detection data over time and evaluating variations of the optical detection data. Orientation sensor 132 can also include a magnetometer, in particular an electronic compass, configured to measure the direction of an ambient magnetic field. The orientation data can comprise information of a spatial orientation of handheld device 131 relative to a reference frame 105 and/or a previous orientation of handheld device 131. Reference frame 105 can be the earth's reference frame. Reference frame 105 can be selected to correspond to a predetermined spatial orientation of handheld device 131.

In particular, the orientation data can indicate changes of the spatial orientation caused by a rotation of handheld device 131, for instance by a rotation around a z-axis in a plane formed by an x-axis and a y-axis of reference frame 105 as schematically indicated by a dashed circular arrow 104. Circular arrow 104 extends in a rotation plane defined by a normal vector pointing in the direction of the z-axis. Rotation plane 104 may thus be spanned by the x-axis and y-axis. The rotation plane may be selected to extend in parallel to a plane in which the directivity of the audio data received via audio signals A1-A3 is provided. In particular, a plane comprising the direction in which the acoustic beam is formed may be selected to correspond to rotation plane

104. In some implementations, rotation plane 104 may be selected to be substantially parallel to the floor and/or normal to the gravitational force. To this end, orientation sensor 132, for instance an accelerometer, can be configured to detect the direction of the gravitational force.

The orientation data generated by handheld device 131 can thus be provided independently from a spatial orientation of remote device 121 allowing to adjust the directivity of the audio data representing the sound detected by sound detectors 123-125 in dependence of the orientation data during a stationary positioning of remote device 121. Furthermore, the orientation data can be generated independently from a spatial orientation of hearing device 111 when worn at the user's ear, and therefore independently from a momentary orientation of the user's head. Thus, by rotating handheld device 131, the user can adjust the directivity in a convenient and reliable way, thereby avoiding unintentional changes of the directivity based on orientation data which would be sensitive to head movements. In this context, it has been found that head rotations often are spontaneous, imprecise and of short term nature such that orientation data based on manual rotations of a handheld device is more adequate for allowing a controlled adjusting of the directivity of remotely detected sound in a user-friendly way.

Handheld device 131 further comprises a processor 136 communicatively coupled to orientation sensor 132, and a communication port 137 communicatively coupled to processor 136. Processor 136 is configured to provide control data based on the orientation data generated by orientation sensor 132 to communication port 137. Communication port 137 is configured to send the control data to communication port 127 of remote device 121 via control data communication link 155. In some implementations, processor 136 is configured to determine a selected direction from the orientation data and to provide the control data such that the control data is indicative of the selected direction. The selected direction can correspond to a direction selected by the user by adjusting a spatial orientation of handheld device 131. The directivity of the audio data can thus be provided corresponding to the selected direction. In some implementations, processor 136 is configured to provide the control data such that the control data includes the orientation data. The selected direction may then be determined by processor 126 of remote device 121 and/or by processor 116 of hearing device 111 after transmission of the control data from handheld device 131. The processing unit of hearing system 101 may further comprise processor 136 of handheld device 131.

In some implementations, processor 136 is configured, based on the generated orientation data, to determine a spatial orientation of handheld device 131 relative to a predefined plane. The predefined plane may correspond to rotation plane 104. Rotation plane 104 may be any plane in which the handheld device is rotatable. A change of the directivity of the audio data may be controlled in the directivity provision step depending on the control data based on the orientation data generated during and/or after the rotation. For instance, as described above, rotation plane 104 may be predefined to extend in parallel to a plane comprising the direction in which the acoustic beam is formed and/or may be selected to be substantially parallel to the floor and/or normal to the gravitational force. In particular, rotations of handheld device 131 in the direction of the z-axis of reference frame 105, which may imply rotations around the x-axis and/or y-axis and/or linear combinations thereof, can provoke a spatial orientation of handheld device 131 deviating from rotation plane 104.

Processor 136 can be further configured to evaluate, based on the spatial orientation relative to rotation plane 104, an orientation criterion of handheld device 131. For instance, the orientation criterion may be determined to be fulfilled when a screen and/or user interface of handheld device 131 faces in an upward direction substantially in parallel to the rotation plane 104, in particular opposite to the gravitational force. To illustrate, such a condition may be fulfilled when handheld device 131 is placed on a table and/or floor with the screen and/or user interface facing up. The orientation criterion may be determined not to be fulfilled when the spatial orientation of handheld device 131 strongly deviates from this position relative to rotation plane 104 such as, for instance, when the screen and/or user interface of handheld device 131 faces downward. In a case in which the orientation criterion is determined to be fulfilled, the audio data may be provided with a directivity depending on the control data, as described above. In a case in which the orientation criterion is determined to be not fulfilled, a different operation can be activated by processor 136. The different operation may comprise disabling the provision of the directivity of the audio data may depending on the control data and/or activating an automated provision of the directivity of the audio data and/or muting the reproduction of the audio data representing the sound detected by remote device 121.

Handheld device 131 further comprises a user interface 133 communicatively coupled to processor 136. Processor 136 is configured, depending on a user command received via user interface 133, to initiate an initialization step. In the initialization step, reference data based on the orientation data generated at an initial time can be determined by processor 136. The reference data can thus be representative of the orientation data during a placement of handheld device 131 at an initial spatial orientation at the initial time, in particular relative to a placement of remote device 121 at a default spatial orientation. The reference data can be employed to determine the selected direction by comparing the orientation data generated at a later time with the reference data.

Handheld device 131 further comprises a communication port 134 configured to communicate with cloud 141 via a cloud communication link 159, for instance an internet link. Communication port 134 is communicatively coupled to processor 136. Program 144 containing instructions of providing the control data based on the orientation data can thus be downloaded by processor 136 from database 143. Processor 136 may include a memory for a non-transitory installing and/or storing of program 144.

Figure 2:
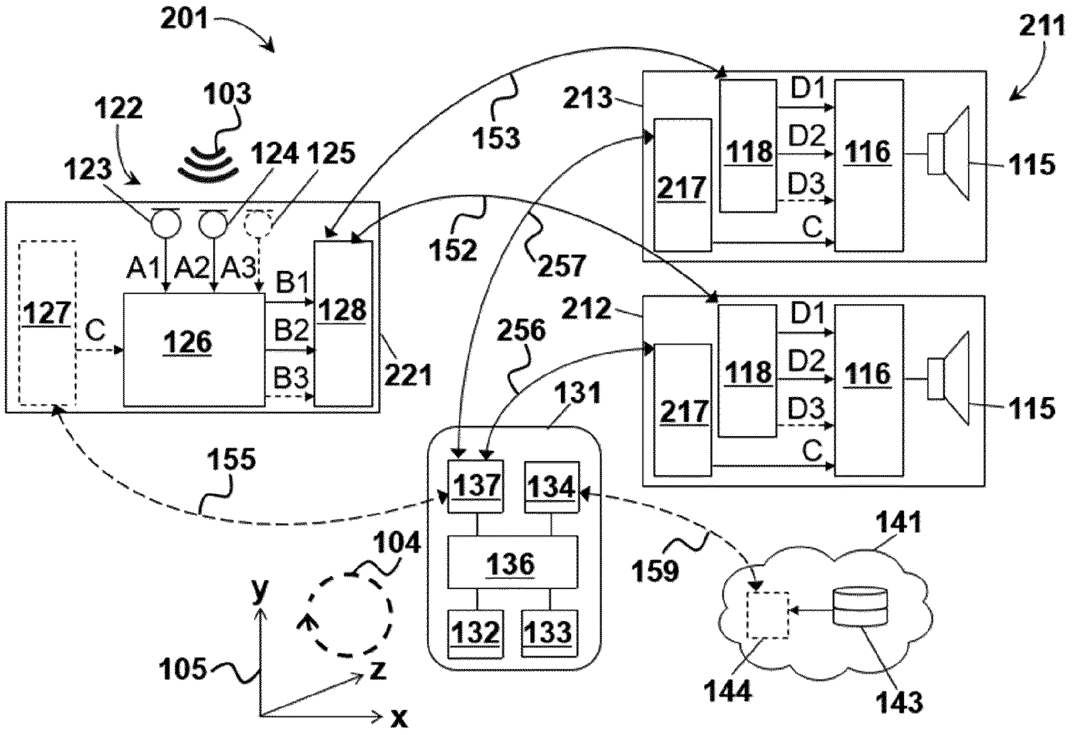

FIG. 2 illustrates a hearing system 201 comprising a hearing device 211 configured to be worn at an ear of a user, a remote device 221 configured to be operated remote from the user, and handheld device 131 and/or computer-readable medium 143 storing program 144. Processor 126 of remote device 221 is configured to pass audio signals B1-B3 to audio data communication port 128 via a respective separate output signal channel. In some implementations, audio signals B1-B3 correspond to raw audio signals A1-A3 substantially without a signal processing of the audio data performed by processor 126. Processor 126 may then be replaced by any unit configured to forward raw audio signals A1-A3 substantially unaltered as audio signals B1-B3. In some other implementations, processor 126 is configured to perform a pre-processing of the audio data in audio signals A1-A3 and to output the pre-processed audio data in audio signals B1-B3.

Hearing device 211 comprises a left ear unit 212 and a right ear unit 213. The audio data contained in audio signals B1-B3 can be transmitted from communication port 128 of remote device 221 to communication port 118 of the respective ear unit 212, 213 via audio data communication link 152, 153. Communication port 118 is communicatively coupled to processor 116 of the respective ear unit 212, 213 via a plurality of signal channels configured to supply processor 116 with separate audio signals D1-D3 containing the received audio data corresponding to separate audio signals B1-B3. Processor 116 is configured to process the audio data received via audio signals D1-D3 in order to provide the audio data with a directivity, as described above in conjunction with remote device 121. The processing of the audio data by processor 116 can be performed differently in each ear unit 212, 213 in order to exploit the binaural configuration of hearing device 211.

Ear units 212, 213 further comprise a communication port 217 configured to receive the control data from handheld device 131 via a respective wireless communication link 256, 257. Communication link 256, 257 can be established between communication port 137 of handheld device 131 and communication port 217 of ear units 212, 213, corresponding to communication link 155 described above. The control data based on the orientation data generated by handheld device 131 can thus be received by communication port 217 via communication link 256, 257. Control data communication port 217 is communicatively coupled with processor 116 via a control signal channel supplying processor 116 with control signal C containing the control data. The directivity of the audio data can thus be provided by processor 116 at the ear level depending on the control data.

In some implementations, the control data based on the orientation data generated by handheld device 131 can additionally be received by communication port 127 of remote device 221 via communication link 155. Processor 126 of remote device 221 may then be configured to provide an initial processing of raw audio signals A1-A3 in order to provide pre-processed audio data in audio signals B1-B3 depending on the control data. For instance, a signal-to-noise ratio (SNR) may be improved in audio signals B1-B3, in particular by a preliminary mixing of the audio data, before transmission to ear units 212, 213. The pre-processed audio data received via audio signals D1-D3 may then be further processed by processor 116 of ear units 212, 213 in order to provide the audio data with the directivity at the ear level.

Figure 3:
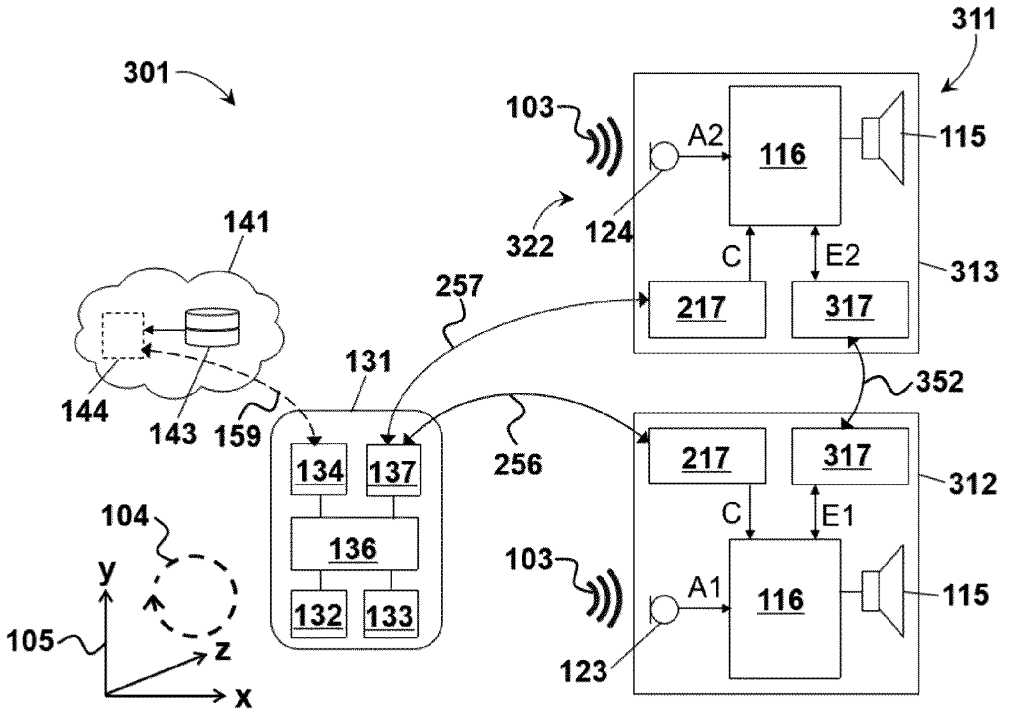

FIG. 3 illustrates a hearing system 301 comprising a hearing device 311 configured to be worn at an ear of a user, and handheld device 131 and/or computer-readable medium 143 storing program 144. Hearing device 311 may be implemented corresponding to hearing device 111, 211 described above, in particular as a BTE or RIC or IIC or CIC hearing aid, or a cochlear implant system, or an earphone or headphone. Hearing device 311 is a binaural device comprising a left ear unit 312 configured to be worn at a left ear of the user, and a right ear unit 313 configured to be worn at a right ear of the user. Left ear unit 312 includes sound detector 123 constituting a first sound detector. Right ear unit 313 includes sound detector 124 constituting a second sound detector. First sound detector 123 and second sound detector 124 constitute a detector arrangement 322 of spatially separated sound detectors. A processing unit comprises processor 116 of left ear unit 312 and processor 116 of right ear unit 313. The processing unit may further comprise processor 136 of handheld device 131.

Processor 116 of left ear unit 312 is communicatively coupled to first sound detector 123 via a first signal channel delivering the audio data in audio signal A1. Processor 116 of right ear unit 313 is communicatively coupled to second sound detector 124 via a second signal channel delivering the audio data in audio signal A2. Ear units 312, 313 are configured to exchange audio data via an audio data communication link 352. Each ear unit 312, 313 comprises a communication port 317 configured to send and receive audio data to the communication port 317 of the other ear unit 312, 313 via communication link 352. Processor 116 of each ear unit 312, 313 is communicatively coupled to respective communication port 317 via a respective signal channel. An audio signal E1 representative of audio data in audio signal A1 can thus be received by processor 116 of right ear unit 313 from processor 116 of left ear unit 312 via communication link 352. An audio signal E2 representative of audio data in audio signal A2 can be received by processor 116 of left ear unit 312 from processor 116 of right ear unit 313 via communication link 352. Audio data contained in audio signal A1 and in audio signal A2 can thus be received by processor 116 of each ear unit 312, 313 via a separate audio channel. Processor 116 of each ear unit 312, 313 is configured to provide the received audio data with a directivity, in particular by performing a binaural acoustic beamforming, depending on the control data received the from handheld device 131 via the respective communication link 256, 257.

Figure 4:
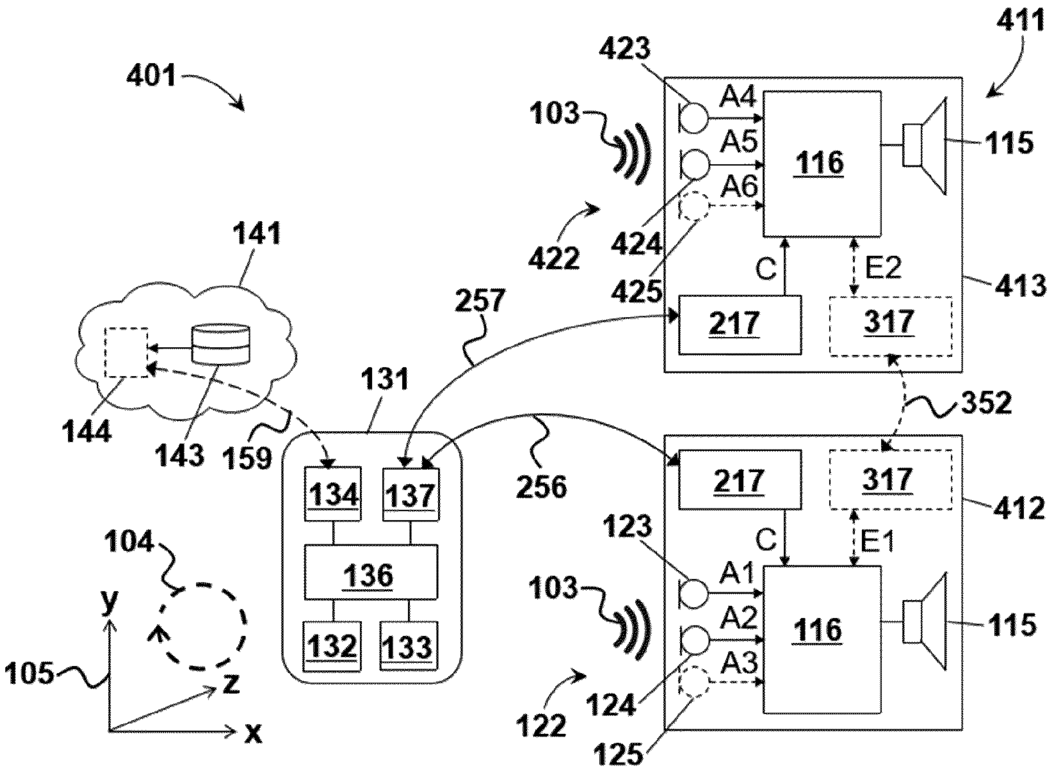

FIG. 4 illustrates a hearing system 401 comprising a hearing device 411 configured to be worn at an ear of a user, and handheld device 131 and/or computer-readable medium 143 storing program 144. Hearing device 411 comprises a left ear unit 412 and a right ear unit 413. Left ear unit 412 comprises detector arrangement 122 including at least two spatially separated sound detectors 123, 124, 125. Detector arrangement 122 is a first detector arrangement, which may be implemented as a microphone array. Right ear unit 413 comprises a second detector arrangement 422 including at least two spatially separated sound detectors 423, 424, 425. A processing unit comprises processor 116 of left ear unit 312 and/or processor 116 of right ear unit 313. The processing unit may further comprise processor 136 of handheld device 131.

Processor 116 of left ear unit 412 is communicatively coupled to sound detectors 123-125 via the separate signal channels such that the audio data in each of signals A1-A3 can be separately supplied to processor 116 of left ear unit 412. Processor 116 of right ear unit 413 is communicatively coupled to sound detectors 423-425 via separate signal channels such that audio data in audio signals A4-A6 representing sound detected by sound detectors 423-425 can be separately supplied to processor 116 of right ear unit 413. Processor 126 of left ear unit 412 is configured to process the audio data received via audio signals A1-A3 in order to provide the audio data with a directivity. Processor 126 of right ear unit 413 is configured to process the audio data received via audio signals A4-A6 in order to provide the audio data with a directivity. The directivity of the audio data is provided depending on the control data received via communication link 256, 257 from handheld device 131.

In some implementations, ear units 312, 313 are configured to exchange audio data via audio data communication link 352. The audio data in signals A1-A3 and the audio data in signals A4-A6 may then be exchanged between processor 126 of left ear unit 412 and processor 126 of right ear unit 413. Processor 116 may thus be configured to receive the audio data in signals A1-A6 via a respective separate channel and to provide the received audio data with a directivity, in particular by performing binaural acoustic beamforming. In particular, sound detectors 123-125 of first detector arrangement 122 and sound detectors 423-425 of second detector arrangement 422 may jointly form a detector arrangement for providing audio data representative of the detected sound. The audio data can then be provided with a directivity by processor 116 of each ear unit 312, 313 depending on the control data received from handheld device 131.

Figure 5:
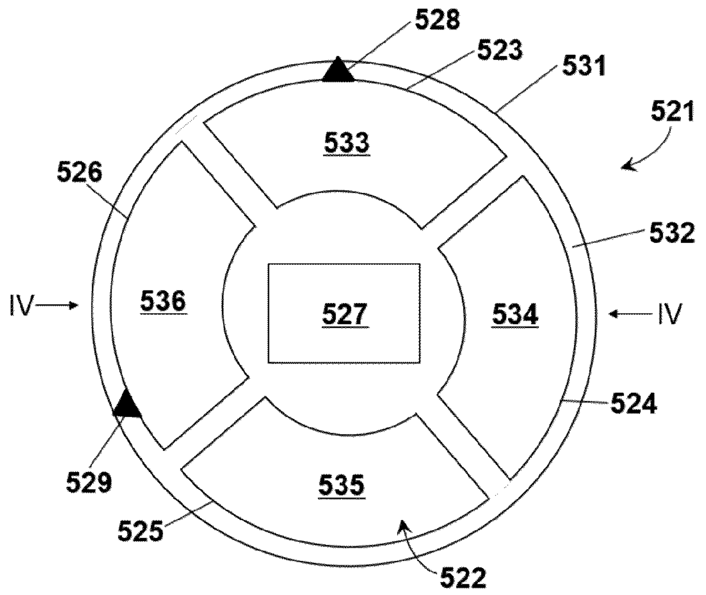
FIG. 5 schematically illustrates a remote device in a top view that may be implemented with the hearing system illustrated in FIG. 1 or in FIG. 2.
Figure 6:
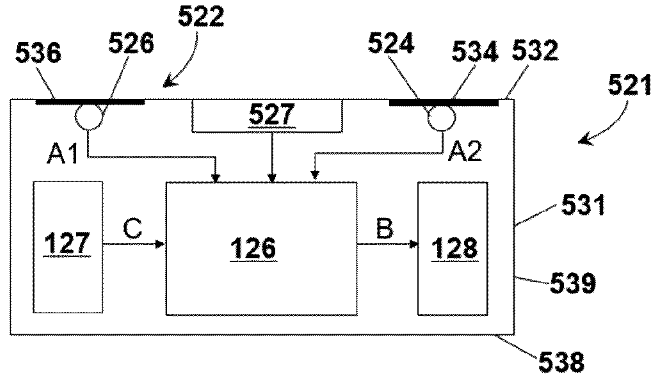
FIG. 6 schematically illustrates the remote device depicted in in FIG. 3 in a cross sectional view along line IV.

FIG. 5 schematically illustrates a remote device 521 in a top view. FIG. 6 schematically illustrates remote device 521 in a cross-sectional view along line IV. Remote device 521 may be implemented in hearing system 101 in the place of remote device 121, or in hearing system 201 in the place of remote device 221. Remote device 521 comprises a housing 531 including a top face 532 and a bottom face 538. Top face 532 and bottom face 538 are facing in opposite directions. Housing 531 further includes a side face 539 connecting an outer edge of top face 532 and bottom face 538. An inner volume of housing 531 is laterally delimited by side face 539, upwardly delimited by top face 532, and downwardly delimited by bottom face 532. In the illustrated example, housing 531 is disc shaped. Bottom face 538 constitutes a support configured to be stationary placed on a plane, for instance on a table surface and/or a floor. A plane defined by bottom face 538 may correspond to the plane spanned by the x-axis and y-axis of reference frame 105, as illustrated in FIGS. 1-4, such that the z-axis is normal to bottom face 538. In particular, rotation plane 104 may be predefined to correspond to bottom face 538.

Remote device 521 further comprises a detector arrangement 522 including a plurality of spatially separated sound detectors 523, 524, 525, 526. Sound detectors 523-526 each comprise a sound detection surface 533, 534, 535, 536. Sound detection surface 533-536 is provided on top face 532 of housing 531. In this way, sound impinging from various directions on top face 532 can be detected. Sound detection surface 533-536 is oriented in an opposite direction with respect to bottom face 538. The support provided at bottom face 538 allows to position sound detection surfaces 533-536 at a defined distance from the plane on which remote device 521 is disposed in a reproducible way. Sound detection surface 533-536 may be implemented as a membrane excitable to vibrate by an impinging sound. Sound detection surfaces 533-536 are spaced apart in a circular arrangement.

Housing 531 comprises at least one visible orientation characteristic 528, 529. In the illustrated example, two orientation characteristics 528, 529 are schematically indicated. Orientation characteristic 528, 529 can indicate a default spatial orientation of remote device 521. Orientation characteristic 528, 529 can thus allow the user to align a spatial orientation of handheld device 131 with a default spatial orientation of remote device 521. Orientation characteristic 528, 529 may be provided by a visual marker, for instance an arrow, indicating a default direction, for instance a front direction, of remote device 521. Orientation characteristic 528, 529 may also be provided by a shape of housing 531, in particular an asymmetric shape, allowing to identify the default direction of remote device 521. Orientation characteristic 528, 529 may also be provided by a light emitter or another visible feature provided at housing 531.

The user can position remote device 521 in a way that orientation characteristic 528, 529 is aligned to his position. A default spatial orientation of remote device 521 can be defined by the alignment. For instance, the user may choose that a particular orientation characteristic 528, 529 points in a front direction relative to his body in order to position remote device 521 in the default spatial orientation. The user may then rotate handheld device 131 to align handheld device 131 with orientation characteristic 528, 529. For instance, the user may choose to align a front direction of remote device 521, which may be defined by a direction pointing away from a front face of remote device 521, with the default spatial orientation of remote device 521 such that the front direction of remote device 521 points toward a particular orientation characteristic 528, 529. Relating the spatial orientation of remote device 521 and the spatial orientation of handheld device 131 in such a way can be exploited to also relate the direction of the sound detected by remote device 521 to the orientation data generated by handheld device 131. The user may thus select a preferred directivity of the audio data representing the detected sound by choosing an appropriate spatial orientation of handheld device 131.

In some implementations, after aligning handheld device 131 and remote device 521 with respect to their spatial orientation, the user may initiate an initialization step via a user interface. For instance, a user interface 527 provided on remote device 521 and/or user interface 133 of handheld device 131 may be configured to take instructions from the user to initiate the initialization step. In the initialization step, reference data can be determined based on orientation data generated by handheld device 131 at an initial time relative to the placement of remote device 521 at the default spatial orientation. The reference data can then be employed to relate the orientation data generated by handheld device 131 at a later time to the default spatial orientation of remote device 521. A selected direction for the directivity of the audio data can thus be determined by comparing the orientation data generated by handheld device 131 with the reference data.

In some other implementations, reference data may be employed representing orientation data generated by the handheld device at a first time. The reference data can then be compared with orientation data generated by the handheld device at a second time in order to determine the selected direction.

In some implementations, the user may select orientation characteristic 528, 529 in order to indicate his spatial position to remote device 521. For instance, a plurality of orientation characteristics 528, 529 can be circularly arranged around a center of remote device 521. The user may select a corresponding orientation characteristic 528, 529 via user interface 527. Orientation characteristics 528, 529 may also be configured to be directly manipulated by the user. For instance, orientation characteristics 528, 529 can be implemented as push buttons such that the user can indicate a selected orientation characteristic 528, 529 by pushing it.

Figure 7:
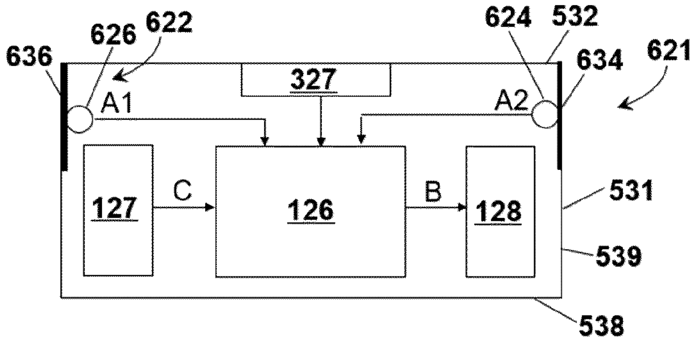
FIG. 7 schematically illustrates another remote device in a cross sectional view that may be implemented with the hearing system illustrated in FIG. 1 or in FIG. 2.

FIG. 7 schematically illustrates a remote device 721 in a cross-sectional view. Remote device 721 may be implemented in hearing system 101 in the place of remote device 121, or in hearing system 201 in the place of remote device 221. Remote device 721 comprises a detector arrangement 622 including a plurality of spatially separated sound detectors 624, 626. A sound detection surface 634, 636 of sound detectors 624, 626 is provided at side face 539 of housing 531. Sound detection surfaces 634, 636 are oriented in different directions. Sound impinging from various directions on side face 539 can thus be detected.

Figure 8:
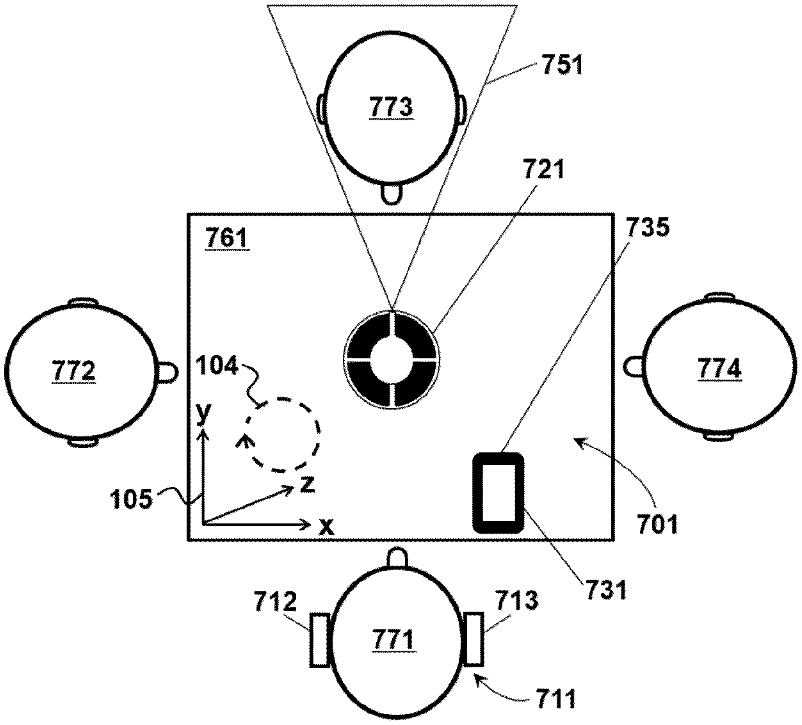
FIGS. 8, 9 schematically illustrate a hearing situation in which the hearing system illustrated in FIG. 1 or in FIG. 2 can be applied.
Figure 9:
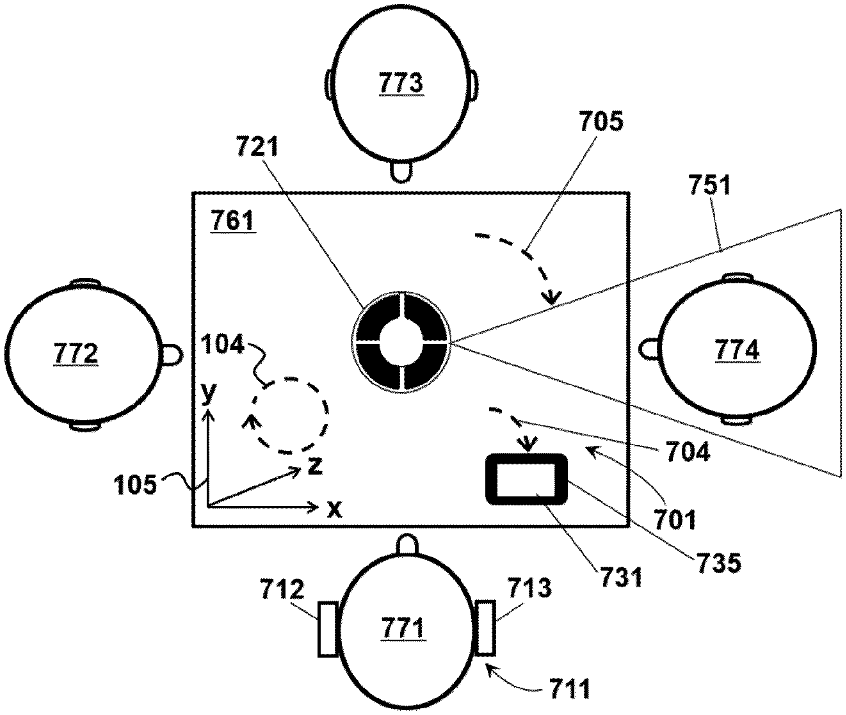

FIGS. 8 and 9 schematically illustrate a hearing situation involving a user 771 of a hearing system 701 and three conversation partners 772, 773, 774 of user 771 gathered around a table 761. Hearing system 701 comprises a hearing device 711 including a left ear unit 712 and a right ear unit 713 worn by user 771 and a remote device 721 placed on table 761 at a center position. A handheld device 731 is placed on table 761 in proximity to user 771. Hearing system 701 may also comprise handheld device 731 and/or a computer-readable medium storing instructions causing handheld device 731 to provide control data. Hearing system 701 may be implemented by hearing system 101, or by hearing system 201. A plane defined by a surface of table 761 may correspond to the plane spanned by the x-axis and y-axis of reference frame 105 such that the z-axis is normal to the plane. In particular, rotation plane 104 may be predefined to correspond to the table surface 761. Further schematically illustrated is an acoustic beam 751 formed by a processing of audio data representing sound detected by remote device 721 such that the audio data is provided with a directivity corresponding to a direction of the formed acoustic beam 751.

In a first scenario illustrated in FIG. 8, handheld device 731 is positioned on table 761 such that a front face 735 of handheld device 731 is oriented in the same direction in which user 771 faces remote device 721. In the illustrated example, the audio data is provided with a directivity corresponding to the orientation data generated by handheld device 731 such that acoustic beam 751 is oriented in the same direction as front face 735 of handheld device 731.

In a second scenario illustrated in FIG. 9, handheld device 731 is rotated by a right angle on the plane of table 761, as schematically illustrated by an arrow 704. As a result, the front direction of handheld device 731 in which front face 735 is oriented is perpendicular to the direction in which user 771 faces remote device 721. Accordingly, depending on the control data based on the orientation data generated by handheld device 731, acoustic beam 751 is rotated by a corresponding amount such that it points in the same direction, as schematically illustrated by an arrow 705. By appropriate rotation of handheld device 731, user 771 is thus enabled to select any of conversation partners 772, 773, 774 as a sound source for which the directivity shall be provided in the audio data. In this way, the orientation data generated by handheld device 731 can be employed for a target selection in order to form an acoustic beam directed to the target.

In some implementations, the alignment of the front direction of handheld device 731 and the direction in which user 771 faces remote device 721, as illustrated in FIG. 8, can be employed to determine reference data based on the orientation data generated at an initial time during an initialization step. Orientation data generated at a subsequent time can thus be compared with the reference data to determine the spatial orientation of handheld device 731 relative to the spatial orientation of remote device 721. A change of the spatial orientation of handheld device 731 can thus be determined relative to the spatial orientation of remote device 721. In addition, remote device 721 may be positioned in a default spatial orientation which may be determined by orientation characteristic 528, 529. In some other implementations, orientation data generated at a first time and a second time by handheld device 731 may be compared independently from the spatial orientation of remote device 721. In both cases, the comparison may be employed to determine a direction selected by user 771, wherein the audio data is provided with a directivity corresponding to the selected direction.

In some implementations, a spatial orientation of handheld device 731 relative to a predefined plane is determined, wherein the audio data is provided with a directivity in dependence of the control data depending on the spatial orientation of the handheld device relative to the predefined plane. In particular, an orientation criterion of the determined spatial orientation relative to the predefined plane may be evaluated. The predefined plane may be provided as rotation plane 104. The orientation criterion may be determined to be fulfilled when handheld device 731 points in an upward direction away from table surface 761. In this case, the audio data may be provided with a directivity depending on the control data. The orientation criterion may be determined to be not fulfilled when handheld device 731 points in a transverse direction and/or in a downward direction toward table surface 761. In this case, the audio data may not be provided with a directivity depending on the control data. Instead, a different operation may be activated, for instance disabling the forming of beam 751 in a direction depending on the control data and/or activating an automated steering of beam 751 and/or muting the reproduction of the sound detected by remote device 721 and/or performing another operation of providing the audio data. Thus, user 771 can be enabled to control several functionalities of hearing system 701 in a convenient way. More particularly, changing the spatial orientation of the handheld device relative to the predefined plane can be performed by the user by a manual gesture, such as manually flipping or tilting handheld device 731 with respect to the spatial orientation relative to predefined plane 104, which can be carried out rather effortlessly and may be easily remembered by user 771.

Figure 10:
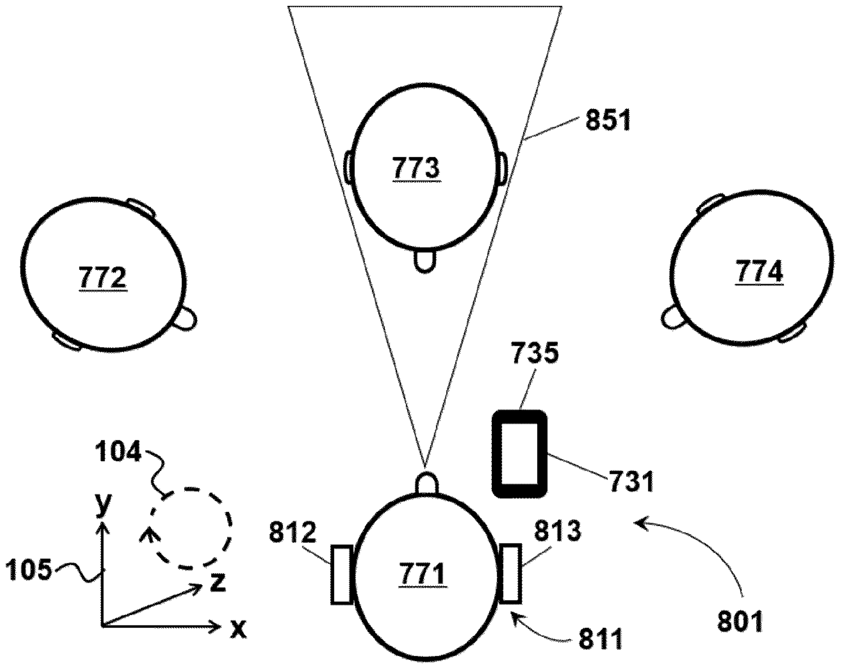
FIGS. 10, 11 schematically illustrate a hearing situation in which the hearing system illustrated in FIG. 3 or in FIG. 4 can be applied.
Figure 11:
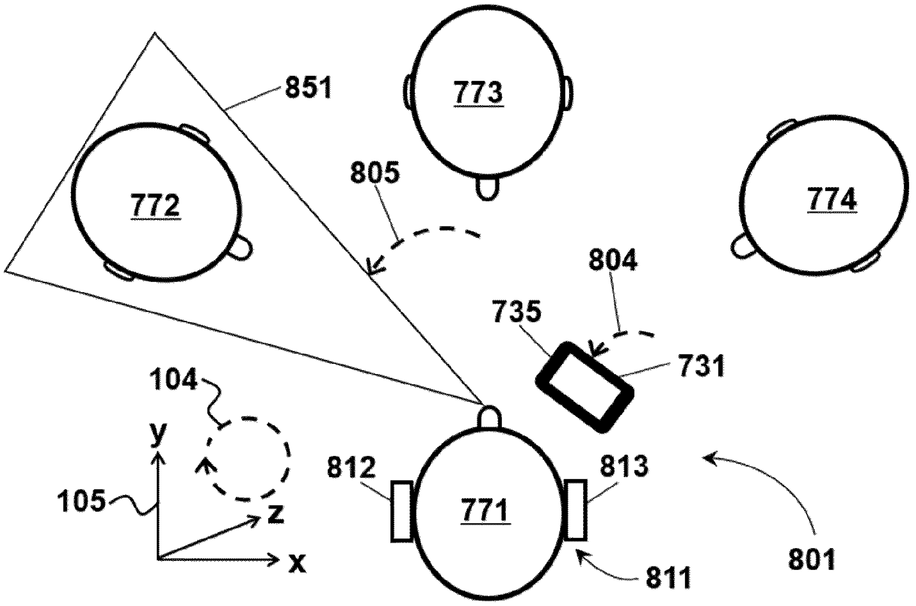

FIGS. 10 and 11 schematically illustrate a hearing situation involving user 771 using a hearing system 801 and conversation partners 772, 773, 774 talking to each other in a standing position. Hearing system 801 comprises a hearing device 811 including a left ear unit 812 and a right ear unit 813 worn by user 771. User further holds handheld device 731 on a palm of one of his hands. Hearing system 801 may also comprise handheld device 731 and/or a computer-readable medium storing instructions causing handheld device 731 to provide control data. Hearing system 801 may be implemented by hearing system 301, or by hearing system 401. A ground plane defined by a surface on which individuals 771-774 are standing may correspond to the plane spanned by the x-axis and y-axis of reference frame 105 such that the z-axis is normal to the plane. In particular, rotation plane 104 may be predefined to correspond to the ground plane. Further schematically illustrated is an acoustic beam 851 formed by a processing of audio data representing sound detected by hearing device 811 such that the audio data is provided with a directivity corresponding to a direction of the formed acoustic beam 851.

In a first scenario illustrated in FIG. 10, handheld device 731 is positioned on the user's hand such that that front face 735 of handheld device 731 is oriented in the same direction in which user 771 faces with a front side of his body. In the illustrated example, the audio data is provided with a directivity corresponding to the orientation data generated by handheld device 731 such that acoustic beam 851 is oriented in the same direction as the front side of the user's body.

In a second scenario illustrated in FIG. 11, handheld device 731 is rotated by an acute angle in parallel to the ground plane, as schematically illustrated by an arrow 804. As a result, the front direction of handheld device 731 in which front face 735 is oriented points in a transverse direction relative to the orientation of the front side of the user's body. Accordingly, depending on the control data based on the orientation data generated by handheld device 731, acoustic beam 851 is rotated by a corresponding amount such that it points in the corresponding transverse direction, as schematically illustrated by an arrow 805. In the illustrated example, user 771 has selected conversation partner 772 as a target for which the directivity shall be provided in the audio data. Accordingly, acoustic beam 851 is directed toward conversation partner 772.

In some implementations, the alignment of the front direction of handheld device 731 and the direction in which the user 771 faces with the front side of his body, as illustrated in FIG. 10, can be employed to determine reference data based on the orientation data generated at an initial time during an initialization step. Orientation data generated at a subsequent time can thus be compared with the reference data to determine the spatial orientation of handheld device 731 relative to the spatial orientation the front side of the user's body. A change of the spatial orientation of handheld device 731 can thus be determined relative to the front side of the user's body. In some other implementations, reference data may be provided representing orientation data generated by handheld device 731 at a first time. The reference data can then be compared with orientation data generated by handheld device 732 at a second time to determine the selected direction. Orientation data generated at the first time, as included in the reference data, and orientation data generated at the second time by handheld device 731 may thus be compared independently from the front side of the user's body. In both cases, the comparison may be employed to determine a direction selected by user 771, wherein the audio data is provided with a directivity corresponding to the selected direction.

In some implementations, the audio data is provided with a directivity depending on the control data depending on whether the spatial orientation of handheld device 731 is a certain range relative to a predefined plane. The predefined plane may be provided as rotation plane 104. Rotation plane 104 may be defined as a plane in parallel to the ground plane. Thus, by changing the spatial orientation of the handheld device relative to the ground plane by a manual gesture, such as manually flipping or tilting handheld device 731 relative the direction of the gravitational force, user 771 can be enabled to turn on and/or to turn off a functionality of hearing system 801 in which the audio data is provided with a directivity depending on the control data. When the functionality is turned off, a different operation of hearing system 801 may be activated instead, as described above.

Figure 12:
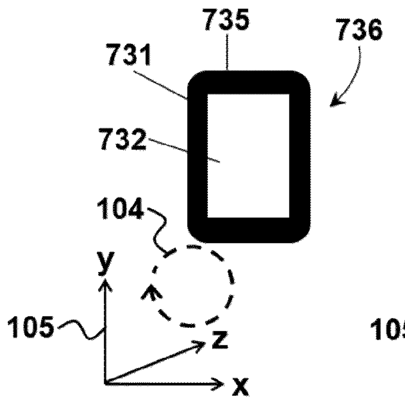
FIGS. 12-14 illustrate a handheld device in different spatial orientations relative to a predefined plane.
Figure 13:
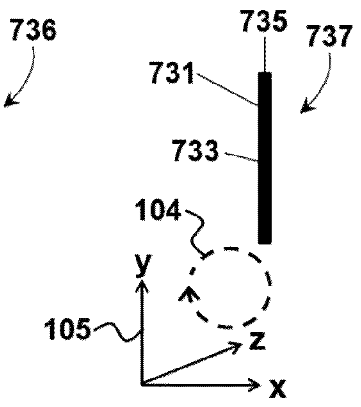
Figure 14:
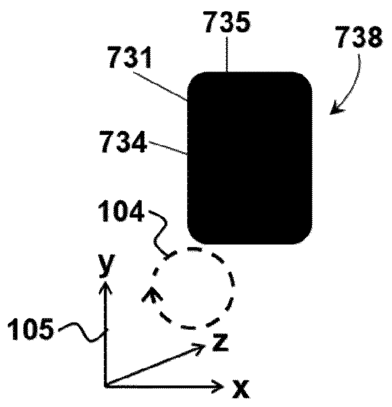

FIGS. 12-14 schematically illustrate handheld device 731 in various spatial orientations 736, 737, 738 relative to a predefined plane. The predefined plane may coincide with rotation plane 104 spanned by the x-axis and y-axis of reference frame 105. Rotation plane 104 may be defined as a plane in which handheld device 731 can be rotated in order to change a selected direction corresponding to which a directivity of the audio data is provided. The rotation may thus be defined as a rotation around the z-axis of reference frame 105 which is perpendicular to the x-axis and y-axis. For instance, the z-axis may be defined to point in a direction of the gravitational force or in an opposite direction relative to the gravitational force. Rotation plane 104 may be defined to extend in parallel to a plane in which the directivity of the audio data is provided.

In the examples illustrated in FIGS. 12-14, front direction 735 of handheld device 731 points in the direction of the y-axis of reference frame 105. By rotating handheld device 731 around the z-axis of reference frame 105, the spatial orientation of front direction 735 can be varied in any direction within rotation plane 104. Thus, the spatial orientation of front direction 735 may form any angle with the y-axis of reference frame 105 between 0 degrees and 360 degrees. A corresponding angle relative to the y-axis may be provided for the directivity of the audio data depending on the control data based on the orientation data provided by handheld device 731.

Spatial orientations 736-738 can be characterized by differing alignments of handheld device 731 relative to the z-axis of reference frame 105. In spatial orientation 736 illustrated in FIG. 12, a top face 732 of handheld device 731 points in an opposite direction relative to the z-axis. A bottom face 734 of handheld device 731 opposing top face 732 thus points in the direction of z-axis. In spatial orientation 737 illustrated in FIG. 13, a lateral face 733 of handheld device 731 points in an opposite direction relative to the z-axis. Top face 732 and bottom face 734 point in a transverse direction relative to the z-axis, in particular perpendicular to the z-axis. In spatial orientation 738 illustrated in FIG. 14, bottom face 734 of handheld device 731 points in an opposite direction relative to the z-axis. Top face 732 points in the direction of z-axis.

The audio data may be provided with a directivity depending on the control data depending on whether a particular spatial orientation 736-738 relative to predefined plane 104 is determined based on the orientation data. The particular spatial orientation may be predefined relative to predefined plane 104. The provision of the audio data with a directivity depending on the control data may be disabled when a spatial orientation 736-738 deviating from the predefined spatial orientation relative to predefined plane 104 is determined. Instead, a different operation of hearing system 701, 801 may be performed, as described above.

This can allow a user of the hearing system to manually activate and/or deactivate the provision of the audio data with a directivity depending on the control data and/or the different operation by a manual gesture involving handheld device 731. In particular, the manual gesture can involve a change of the spatial orientation of handheld device 731 relative to predefined plane 104. For instance, the manual gesture may involve tilting handheld device 731 from spatial orientation 736 to spatial orientation 737 and/or vice versa. The manual gesture may also involve tilting handheld device 731 from spatial orientation 737 to spatial orientation 738 and/or vice versa. The manual gesture may also involve flipping handheld device 731 from spatial orientation 736 to spatial orientation 738 and/or vice versa.

Figure 15:
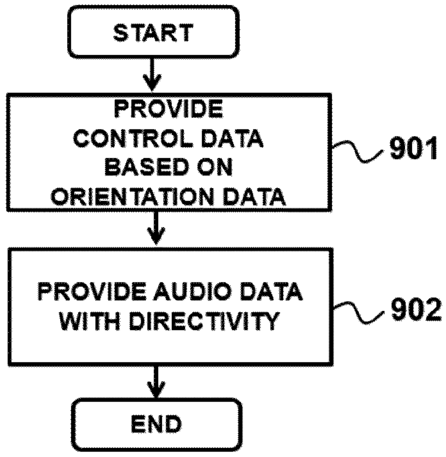
FIGS. 15-23 illustrate exemplary methods of operating a hearing system as illustrated in FIGS. 1-4 or FIGS. 8-11.

FIG. 15 illustrates a method of operating hearing system 101, 201, 301, 401, 701, 801. At 901, in a control data provision step, control data is provided based on orientation data generated by handheld device 131, 731. The control data provision may comprise receiving the control data by remote device 121, 521, 621, 721 and/or hearing device 111, 211, 311, 411, 711, 811 from handheld device 131, 731 via control data communication link 155, 256, 257. At 902, in a directivity provision step, the audio data representative of the sound detected by detector arrangement 122, 322, 422, 522, 622 is provided with a directivity depending on the control data. In some implementations, the directivity is provided by processor 126 included in remote device 121, 521, 621, 721. In some other implementations, the directivity is provided by processor 116 included in hearing device 111, 211, 311, 411, 711, 811. In some other implementations, the directivity is provided partially by processor 126 included in remote device 121, 521, 621, 721 and partially by processor 116 included in hearing device 111, 211, 311, 411, 711, 811. The directivity may correspond to a selected direction controlled by the control data such that the sound detected from the selected direction is predominantly represented in the audio data. In particular, the audio data may be provided with the directivity by performing an acoustic beamforming on the audio data. A direction of the formed acoustic beam may be controlled by the received control data.

Figure 16:
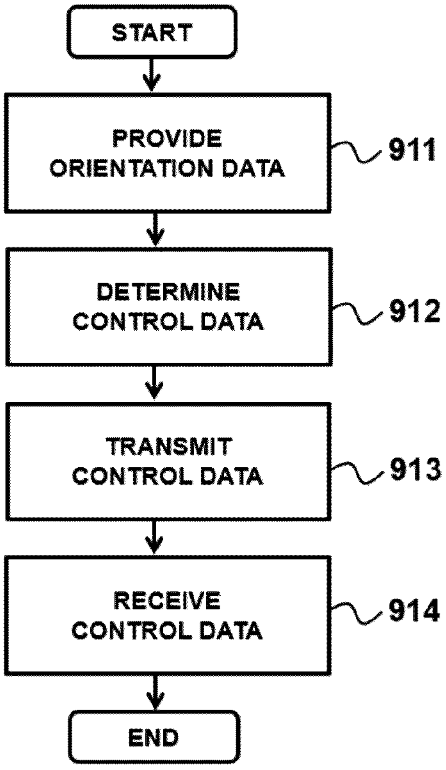

FIG. 16 illustrates a method of providing control data in hearing system 101, 201, 301, 401, 701, 801. At 911, orientation data is generated by orientation sensor 132 implemented with handheld device 131, 731. The orientation data may be indicative of a momentary spatial orientation of handheld device 131, 731 relative to a previous spatial orientation of handheld device 131, 731 and/or the orientation data may be indicative of an absolute spatial orientation of handheld device 131, 731 with respect to a predefined reference frame and/or the orientation data may be indicative of a temporal variation of the spatial orientation of handheld device 131, 731. For instance, the orientation data may be provided by an inertial sensor, such as an accelerometer included in handheld device 131, 731, based on a detected movement of handheld device 131, 731.

At 912, control data is determined based on the orientation data by processor 136 included in handheld device 131, 731. In some implementations, the determined control data includes the generated orientation data. In particular, the orientation data may substantially correspond to the orientation data. In some other implementations, the control data is determined from the orientation data such that the control data is indicative of a selected direction. The selected direction may indicate a direction selected by the user to provide the directivity of the audio data.

At 913, the control data is transmitted by handheld device 131, 731 to remote device 121, 521, 621, 721 and/or to hearing device 111, 211, 311, 411, 711, 811 via control data communication link 155, 256, 257. At 914, the control data is received by remote device 121, 521, 621, 721 and/or hearing device 111, 211, 311, 411, 711, 811. The method including operations 911-914 may be implemented in the place of control data provision step 901. The method may also be implemented independently from hearing system 101, 201, 701 with the exception of receiving, at operation 914, the control data from handheld device 131, 731 by hearing device 111, 211, 311, 411, 711, 811 and/or by remote device 111, 211, 311, 411, 711, 811.

Figure 17:
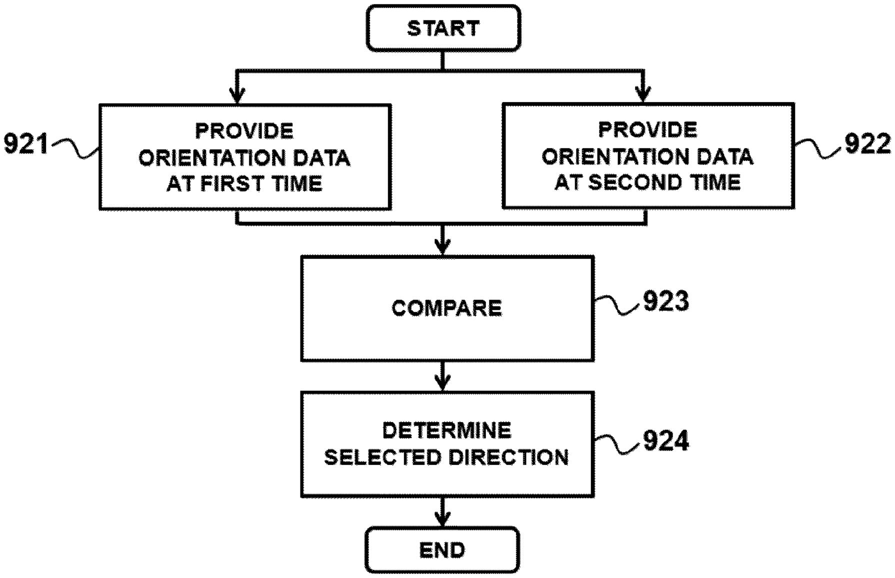

FIG. 17 illustrates a method of determining a selected direction based on the orientation data. At 921, the orientation data is provided at a first time. At 922, the orientation data is provided at a second time. The first time and the second time may be separated by a predetermined time interval. The predetermined time interval may be fixed as a constant or a value varying over time. The orientation data provided at the first time at 921 is subsequently used as reference data. At 923, the reference data is compared with the orientation provided at the second time. In this way, a change of the spatial orientation of handheld device 131, 731 between the first time and the second time can be determined. In particular, the change of the spatial orientation of handheld device 131, 731 may thus be determined independently from the spatial orientation of hearing device 111, 211, 311, 411, 711, 811 and/or remote device 121, 521, 621, 721. At 924 a selected direction is determined based on the comparison at 923. The selected direction can therefore also be determined independently from the spatial orientation of hearing device 111, 211, 311, 411, 711, 811 and/or remote device 121, 521, 621, 721.

Figure 18:
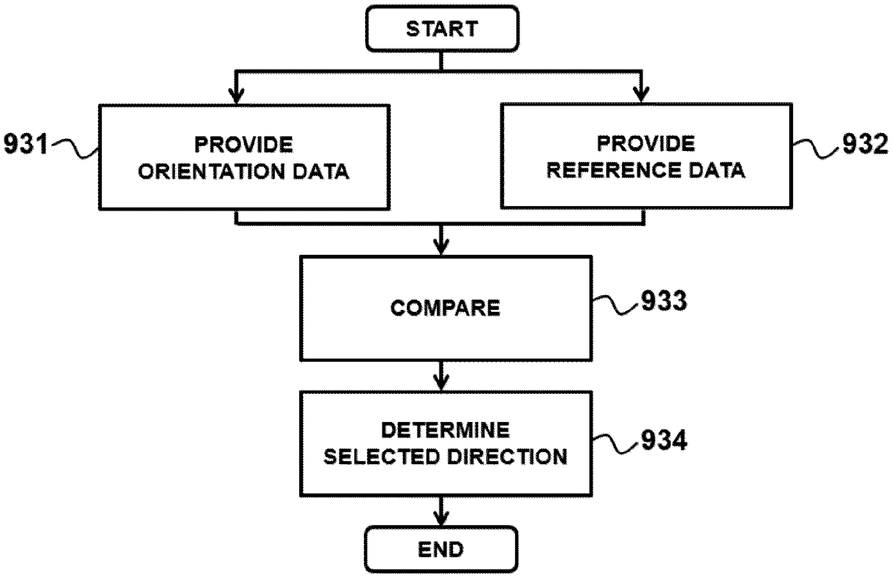

FIG. 18 illustrates another method of determining a selected direction based on the orientation data. At 931, the orientation data is provided. At 932, reference data is provided. At 933, the orientation data is compared to the reference data. The comparison may comprise a calibration of the orientation data by the reference data. The reference data contains information relating the orientation data to a spatial orientation of hearing device 111, 211, 311, 411, 711, 811 and/or remote device 121, 521, 621, 721, in particular a default spatial orientation. The change of the spatial orientation of handheld device 131, 731 can thus be determined relative to the spatial orientation of hearing device 111, 211, 311, 411, 711, 811 and/or remote device 121, 521, 621, 721. At 934 a selected direction is determined based on the comparison at 933. The selected direction can thus correspondingly be determined relative to the spatial orientation of hearing device 111, 211, 311, 411, 711, 811 and/or remote device 121, 521, 621, 721.

The method including operations 931-934 and/or operations 931-934 may be implemented as a direction determining step. In some implementations, the direction determining step is performed by handheld device 131, 731 such that the selected direction can be included in the control data. In some implementations, the direction determining step is at least partially performed by hearing device 111, 211, 311, 411, 711, 811 and/or remote device 121, 521, 621, 721, in particular the determining of the selected direction at 924, 934 and/or the comparison at 923, 933. The audio data provided at operation 902 can thus be provided with a directivity corresponding to the selected direction. As a result, sound detected from the selected direction may be predominantly represented in the audio data.

In other implementations, the selected direction may be determined at operation 924, 934 based on the orientation data provided at operation 922, 931 without the comparison with the reference data at 923, 933. For instance, the orientation data may be provided at 921, 931 such that the orientation data is indicative of the spatial orientation of handheld device 131, 731 relative to a predefined reference frame, such as the earth's reference frame, and/or the spatial orientation of handheld device 131, 731 relative to hearing device 111, 211, 311, 411, 711, 811 and/or remote device 121, 521, 621, 721. Thus, a comparison with reference data, as provided at operation 921, 932, may not be required for determining the selected direction.

Figure 19:
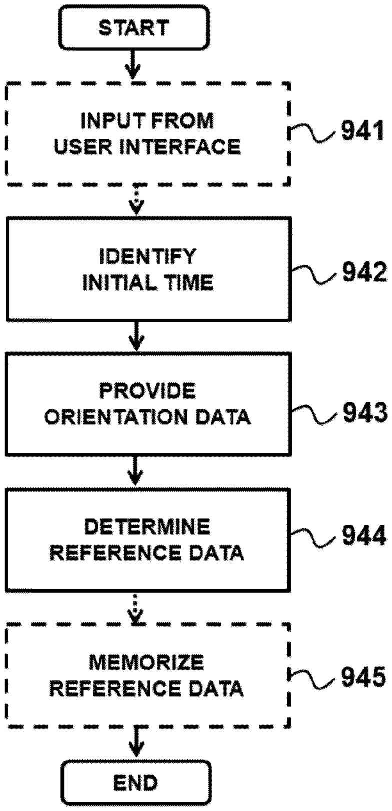

FIG. 19 illustrates a method of determining reference data. At 942, an initial time is identified at which an initialization step is initiated. The initiation may be previously triggered at 941 by an initiation command which may be previously input by a user via a user interface. In this way, the reference data can be representative of the orientation data generated during a placement of handheld device 131, 731 at a spatial orientation selected by the user. At 943, the orientation data is generated at the initial time. At 944, the reference data is determined based on the orientation data generated at the initial time. Thus, the reference data can be representative of the orientation data during a placement of handheld device 131, 731 at an initial spatial orientation at the initial time, in particular relative to a placement of hearing device 111, 211, 311, 411, 711, 811 and/or remote device 121, 521, 621, 721 at a default spatial orientation. The reference data may thus be assigned to a default spatial orientation of hearing device 111, 211, 311, 411, 711, 811 and/or remote device 121, 521, 621, 721 relative to a default spatial orientation of handheld device 131, 731 such that differences between the orientation data and the reference data indicate differences of a momentary spatial orientation of handheld device 131, 731 relative to the default spatial orientation of hearing device 111, 211, 311, 411, 711, 811 and/or remote device 121, 521, 621, 721. The reference data may be subsequently memorized at 945. The reference data may thus be provided at a later time at operation 932.

In other implementations, the reference data relating the orientation data to a spatial orientation of hearing device 111, 211, 311, 411, 711, 811 and/or remote device 121, 521, 621, 721 may be determined automatically and/or independently from a user interaction such that the initialization step including operations 941-945 may not be required. The reference data can be provided by orientation data indicative of the spatial orientation of the detector arrangement. The ear unit and/or the remote device may be configured to generate the orientation data indicative of the spatial orientation of the detector arrangement. The reference data may then be generated by a sensor, in particular an inertial sensor, provided at a fixed position relative to at least one sound detector of the detector arrangement. For instance, hearing device 111, 211, 311, 411, 711, 811 and/or remote device 121, 521, 621, 721 may be provided with an orientation sensor configured to provide orientation data indicative of the spatial orientation of hearing device 111, 211, 311, 411, 711, 811 and/or remote device 121, 521, 621, 721. The orientation data indicative of the spatial orientation of hearing device 111, 211, 311, 411, 711, 811 and/or remote device 121, 521, 621, 721 may then be employed as the reference data.

Figure 20:
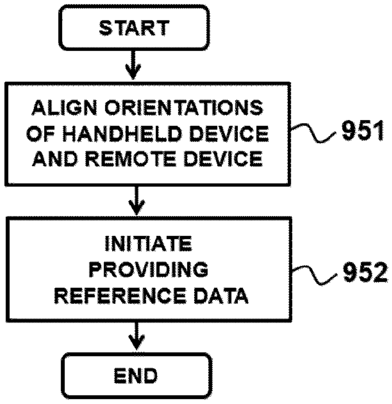

FIG. 20 illustrates a method of preparing the initialization step according to operations 941-945. At 951, the spatial orientations of handheld device 131, 731 and remote device 121, 521, 621, 721 are aligned. The aligning may comprise positioning remote device 121, 521, 621, 721 at a default spatial orientation. To this end, orientation characteristic 528, 529 may be employed. The aligning may further comprise positioning handheld device 131, 731 at an initial spatial orientation relative to the default spatial orientation of remote device 121, 521, 621, 721. Operation 951 may be performed by the user of hearing system 101, 201, 701. Subsequently, at 952, generating the reference data can be initiated by the user corresponding to operation 941.

Figure 21:
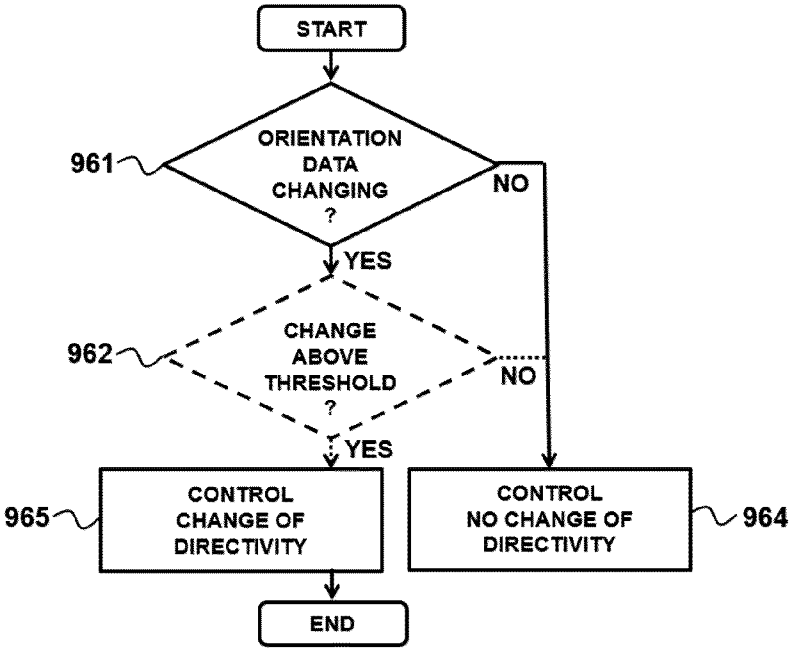

FIG. 21 illustrates a method of providing the audio data with a directivity. At 961, it is determined whether momentary generated orientation data is changing with respect to previously generated orientation data. The determining may be performed on the generated orientation data before providing the control data and/or on the control data which may be based on the orientation data. In some implementations, a continuous change of the orientation data may thus be determined over time.

In a case in which no change of the orientation data has been determined, no change of the directivity provided in the audio data is controlled at 964. In some implementations, in a case in which a change of the orientation data has been determined, a corresponding change of the directivity provided in the audio data is controlled at 965. In this way, the directivity of the audio data may be continuously changed at operation 965 during a continuous change of the orientation data. In some other implementations, in a case in which a change of the orientation data has been determined, it is determined at 962 whether the change of the orientation data is above a threshold. In a case in which the change of the orientation data is below the threshold, operation 964 is performed such that the directivity provided in the audio data is not changed. In a case in which the change of the orientation data is above the threshold, operation 965 is performed such that the directivity provided in the audio data is changed accordingly. In this way, the directivity of the audio data may be gradually changed at operation 965 during a continuous change of the orientation data. The amount of the gradual change may be adjusted by setting the threshold in operation 853 accordingly. The method comprising operations 961-965 may be included in the directivity provision step performed at operation 902.

Figure 22:
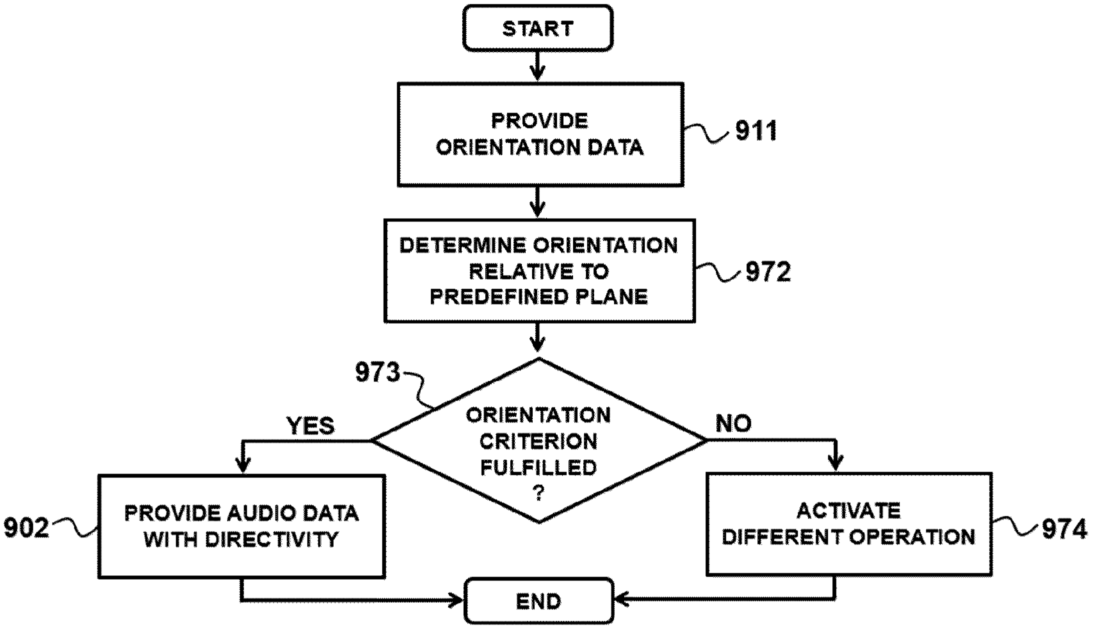

FIG. 22 illustrates a method of enabling a control of different operations of hearing system 101, 201, 301, 401, 701, 801 based on the orientation data. After generating the orientation data at operation 911, a spatial orientation of handheld device 131, 731 relative to a predefined plane is determined at 862. The predefined plane may be rotation plane 104. Rotation plane 104 may be predefined to be oriented in parallel to a plane comprising the direction in which the audio data is provided with the directivity and/or may be selected to be substantially parallel to a ground plane and/or normal to the gravitational force. At 973, it is determined whether a orientation criterion of the spatial orientation of handheld device 131, 731 relative to the predefined plane is fulfilled. In a case in which the orientation criterion is fulfilled, for instance when the spatial orientation of handheld device 131, 731 is within a predefined range relative to rotation plane 104, the audio data is be provided with a directivity depending on the control data at operation 902. In this way, the directivity provision of the audio data in operation 902 can be performed depending on the spatial orientation of the handheld device relative to the predefined plane. For instance, the predefined range may comprise a placement of handheld device 131, 731 in a particular spatial orientation corresponding to any of spatial orientations 736-738. In a case in which the orientation criterion is not fulfilled, in particular when the spatial orientation of handheld device 131, 731 is outside the predefined range relative to rotation plane 104, a different operation is activated at 974. For instance, handheld device 131, 731 may be placed outside the predefined range during a placement of handheld device 131, 731 in any of spatial orientations 736-738 different from the particular spatial orientation in which the orientation criterion is fulfilled. The operation activated at 974 may comprise disabling the provision of the directivity in operation 902 depending on the spatial orientation of handheld device and/or activating an automated directivity adjustment and/or disabling any directivity adjustment of the audio data and/or any other altering of the audio data.

Figure 23:
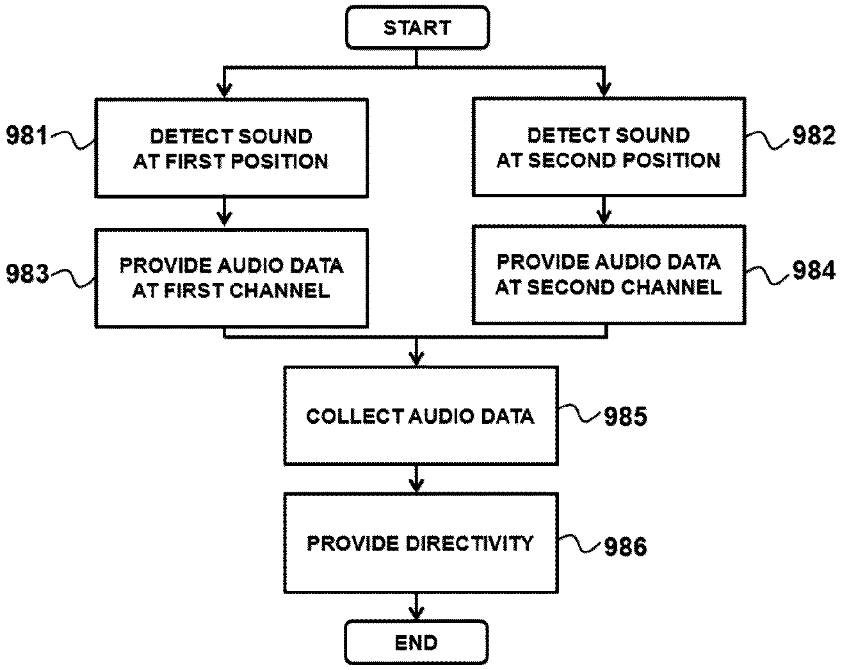

FIG. 23 illustrates a method of providing audio data representing a sound detected by remote device 121, 521, 621, 721. At 981, a sound is detected by sound detector 123-125, 423-425, 523-526, 624, 626 at a first position. At 983, audio data representative of the detected sound is provided in audio signal A1-A6 via a dedicated signal channel. At 982, the sound is detected by another sound detector 123-125, 423-425, 523-526, 624, 626 at a second position. At 984, audio data representative of the detected sound is provided in another audio signal A1-A6 via another dedicated signal channel. Placing sound detectors 123-125, 423-425, 523-526, 624, 626 at different spatial positions can allow to detect the sound depending on a direction from which the sound is detected at the different spatial positions. The information about the direction of the detected sound is contained in the audio data.

At 985, the audio data is collected from the different signal channels by a processing unit, in particular processor 126 included in remote device 121, 521, 721 and/or processor 116 included in hearing device 111, 211, 711. At 986, the collected audio data is provided with a directivity by the processing unit, in particular by performing an acoustic beam forming. The directivity can be provided depending on control data corresponding to operation 902. In particular, the directivity can correspond to a selected direction controlled by the control data such that the sound detected from the selected direction is predominantly represented in the audio data. The acoustic beam can thus be formed in the selected direction. Providing the directivity in the audio data may comprise any of operations 961-965 of the method illustrated in FIG. 21. Moreover, any of operations 862-974 of the method illustrated in FIG. 22 may be employed to enable differing operations for providing the audio data in addition to controlling the directivity depending on the control data.

While the principles of the disclosure have been described above in connection with specific devices, systems and methods, it is to be clearly understood that this description is made only by way of example and not as limitation on the scope of the invention. The above described preferred embodiments are intended to illustrate the principles of the invention, but not to limit the scope of the invention. Various other embodiments and modifications to those preferred embodiments may be made by those skilled in the art without departing from the scope of the present invention that is solely defined by the claims. In the claims, the word "comprising" does not exclude other elements or steps, and the indefinite article "a" or "an" does not exclude a plurality. A single processing unit, processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of operating a hearing system, the hearing system comprising an ear unit configured to be worn at an ear of a user, an output transducer included in the ear unit and configured to stimulate the user's hearing, and a detector arrangement comprising a plurality of spatially separated sound detectors and configured to provide audio data representative of detected sound, wherein the method comprises:

providing, in a control data provision step, control data based on orientation data generated by a handheld device configured to be held at a hand of the user during changing a spatial orientation of the handheld device, the orientation data indicative of the spatial orientation of the handheld device; and providing, in a directivity provision step, the audio data with a directivity depending on the control data provided based on the orientation data generated by the handheld device.

2. The method of claim 1, further comprising determining, in a direction determining step, a selected direction by comparing the orientation data with reference data, wherein, in the directivity provision step, the directivity of the audio data is provided corresponding to the selected direction.

3. The method of claim 2, wherein:

the direction determining step is performed at the control data provision step; and the control data is provided such that the control data is indicative of the selected direction.

4. The method of claim 2, wherein:

the direction determining step is performed after the control data provision step; and the control data is provided such that it includes the orientation data compared with the reference data.

5. The method of claim 2, wherein: the orientation data is generated by the handheld device at a second time; and the reference data is indicative of orientation data generated by the handheld device at a first time.

6. The method of claim 2, wherein the reference data is indicative of a relation between the orientation data and a spatial orientation of the detector arrangement.

7. The method of claim 2, further comprising determining, in an initialization step, the reference data based on the orientation data generated at an initial time.

8. The method of claim 7, wherein the initialization step comprises initiating the initialization step by a user interface.

9. The method of claim 1, further comprising determining, based on the orientation data, a spatial orientation of the handheld device relative to a predefined plane, wherein the directivity provision step is performed depending on the spatial orientation of the handheld device relative to the predefined plane.

10. The method of claim 9, wherein the predefined plane corresponds to a plane in which the directivity of the audio data is provided.

11. The method of claim 1, wherein, in the directivity provision step, the directivity of the audio data is continuously changed at a continuous change of the orientation data.

12. The method of claim 1, wherein, in the directivity provision step, the directivity of the audio data is unaltered when a change of the orientation data is determined to be below a threshold.

13. A non-transitory computer-readable medium storing instructions that, when executed by a processing unit cause the processing unit to perform the method according to claim 1.

14. A hearing system comprising:

an ear unit configured to be worn at an ear of a user;

an output transducer included in the ear unit and configured to stimulate the user's hearing;

a detector arrangement comprising a plurality of spatially separated sound detectors and configured to provide audio data representative of detected sound;

a communication port configured to receive control data from a handheld device configured to be held at a hand of the user during changing a spatial orientation of the handheld device, the control data based on orientation data generated by the handheld device, the orientation data indicative of the spatial orientation of the handheld device; and a processing unit configured to provide the audio data with a directivity depending on the control data provided based on the orientation data generated by the handheld device.

15. The hearing system of claim 14, wherein the hearing system further comprises a non-transitory computer-readable medium storing instructions that, when executed by a processor included in the handheld device, cause the processor to provide the control data.

16. The hearing system of claim 14, wherein the hearing system comprises the handheld device, wherein the handheld device includes a processor configured to provide the control data.

17. The hearing system of claim 14, wherein at least one sound detector of the detector arrangement is included in a remote device, the remote device configured to transmit the audio data representative of the detected sound to the ear unit from a position remote from the ear unit.

18. The hearing system of claim 17, wherein the remote device comprises a visible orientation characteristic allowing the user to align the spatial orientation of the handheld device with the visible orientation characteristic.

19. The hearing system of claim 17, wherein the remote device comprises a support configured to be stationary placed on a plane.

20. The hearing system of claim 14, wherein at least one sound detector of the detector arrangement is included in the ear unit.

* * * * *